US008658251B2

(12) United States Patent
Kawamoto et al.

(10) Patent No.: US 8,658,251 B2
(45) Date of Patent: Feb. 25, 2014

(54) METHOD OF PRODUCING STRUCTURAL MEMBER HAVING PRUSSIAN BLUE-TYPE METAL COMPLEX NANOPARTICLES, STRUCTURAL MEMBER OBTAINED BY THE METHOD, SUBSTRATE, ELECTROCHROMIC DEVICE, RECTIFYING DEVICE, AND PHOTO RESPONDING DEVICE, USING THE STRUCTURAL MEMBER

(75) Inventors: Tohru Kawamoto, Tsukuba (JP); Hisashi Tanaka, Tsukuba (JP); Masato Kurihara, Tsukuba (JP); Masatomi Sakamoto, Tsukuba (JP); Ayako Oomura, Tsukuba (JP); Hiroshi Watanabe, Tsukuba (JP); Akihito Goto, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 264 days.

(21) Appl. No.: 13/001,116

(22) PCT Filed: Jun. 26, 2009

(86) PCT No.: PCT/JP2009/061761
§ 371 (c)(1), (2), (4) Date: Mar. 18, 2011

(87) PCT Pub. No.: WO2009/157554
PCT Pub. Date: Dec. 30, 2009

(65) Prior Publication Data
US 2011/0268963 A1    Nov. 3, 2011

(30) Foreign Application Priority Data

Jun. 27, 2008  (JP) ................................. 2008-168941
May 7, 2009    (JP) ................................. 2009-112861

(51) Int. Cl.
B05D 3/00    (2006.01)
B05D 1/40    (2006.01)
B05D 3/02    (2006.01)

(52) U.S. Cl.
USPC ......................... 427/331; 427/372.2; 427/561

(58) Field of Classification Search
None
See application file for complete search history.

(56) References Cited

U.S. PATENT DOCUMENTS

2008/0266643 A1    10/2008    Kawamoto et al.
2010/0133487 A1    6/2010    Kawamoto et al.

FOREIGN PATENT DOCUMENTS

| EP | 1 873 117 A1 | 1/2008 |
|---|---|---|
| JP | 59-164383 A | 9/1984 |
| JP | 60-189877 A | 9/1985 |
| JP | 1-219723 A | 9/1989 |
| JP | 7-270831 A | 10/1995 |
| JP | 2001-68311 A | 3/2001 |
| JP | 2006-256954 A | 9/2006 |
| JP | 2008-46001 A | 2/2008 |
| WO | WO 2006/087950 * | 8/2006 |
| WO | 2007/020945 A1 | 2/2007 |
| WO | WO 2008/081923 A1 | 7/2008 |

OTHER PUBLICATIONS

DeLongchamp et al., "Multiple-Color Electrochromism from Layer-by-Layer-Assembled Polyaniline/Prussian Blue Nanocomposite Thin Films", Chem. Mater., 2004, vol. 16, No. 23, p. 4799-4805.
Gotoh et al., "Simple synthesis of three primary colour nanoparticle inks of Prussian blue and its analogues", Nanotechnology, Aug. 29, 2007, vol. 18, No. 34, 345609, 6 pages.
Hara et al., "Development of display device by nanoparticles of Prussian blue type complexes", The Japan Society of Applied Physics, Sep. 4, 2007, vol. 68, No. 3, p. 1325.
Hara et al., "Electrochromic Thin Film of Prussian Blue Nanoparticles Fabricated using Wet Process", Japanese Journal of Applied Physics, Part 2, Oct. 25, 2007, vol. 46, No. 38, p. L945-L947.
International Search Report, dated Aug. 18, 2009 issued in PCT/JP2009/061761.
Kawamoto, "Electrochromic devices with nanoparticles of transition-metal complexes", The Electrochemical Society of Japan, Mar. 29, 2008, vol. 75, p. 327.
Shiozaki et al., "Electrochromic thin film fabricated using a water-based color ink of nanoparticles of Prussian blue-type complexes", The Japan Society of Applied Physics, Sep. 4, 2007, vol. 68, No. 3, p. 1325.
Yamada et al., "Synthesis and Isolation of Cobalt Hexacyanoferrate/Chromate Metal Coordination Nanopolymers Stabilized by Alkylamino Ligand with Metal Elemental Control", J. Am. Chem. Soc., 2004, vol. 126, No. 31, p. 9482-9483.
Japanese Office Action for Appl. No. 2010-518079 dated Nov. 26, 2013 (w/ English translation).
Shiozaki, H. et al, "Electrochromic Thin Film Fabricated Using a Water-Dispersible Ink of Prussian Blue Nanoparticles," Japanese Journal of Applied Physics, Feb. 15, 2008, vol. 47, No. 2, pp. 1242-1244.

* cited by examiner

*Primary Examiner* — Sheeba Ahmed
(74) *Attorney, Agent, or Firm* — Birch, Stewart, Kolasch & Birch, LLP

(57) ABSTRACT

A method of producing a structural member having Prussian blue-type metal complex nanoparticles, the method including: constructing the structural member stabilized by a particular process in producing the structural member by providing nanoparticles consisting of Prussian blue-type metal complex onto a substrate; and a structural member having Prussian blue-type metal complex nanoparticles, the structural member having water-dispersible nanoparticles consisting of Prussian blue-type metal complex provided on a substrate and the structural member being stabilized in water by a particular process.

5 Claims, 12 Drawing Sheets

METHOD OF PRODUCING STRUCTURAL MEMBER HAVING PRUSSIAN BLUE-TYPE METAL COMPLEX NANOPARTICLES, STRUCTURAL MEMBER OBTAINED BY THE METHOD, SUBSTRATE, ELECTROCHROMIC DEVICE, RECTIFYING DEVICE, AND PHOTO RESPONDING DEVICE, USING THE STRUCTURAL MEMBER

TECHNICAL FIELD

The present invention relates to a method of producing a structural member having Prussian blue-type metal complex nanoparticles, a structural member obtained by the method, a substrate, an electrochromic device, a rectifying device, and a photo responding device, using the structural member.

BACKGROUND ART

Metal-complexes can be designed in a molecular basis to show various properties, depending on the combination of the kinds of metals and the linking molecules. These materials have a potential in a wide range of applications, and thus it is expected to be applied in various fields such as drugs, luminescent materials, coating medium, etc. On the other hand, fine particles are made fine from bulk solids, and, for example, nanometer-size fine particles often drive a novel character. Such an appearance of the novel characters has extensively been studied and used. For example, semiconductor or metal fine particles show various properties depending on their particle sizes. A stained glass owes its multiple colors to metal ultrafine particles. In addition, the fine particles of a magnetic oxide such as ferrite have been already put into practical use in, for example, DNA analysis.

By the way, among the metal-complexes, Prussian blue and its analogues, i.e. Prussian blue-type metal complex, have extensively been researched and studied for applying them to the practical use. Prussian blue has used as a blue pigment from the past, and besides it has been studied in progress as a potential material for applications of advanced engineering fields such as displays and biosensors. FIG. 17 shows the crystal structure of the Prussian blue-type metal complex. The structure is relatively simple, and is such that two kinds of metal atoms (metal atoms 221 ($M_A$) and metal atoms 224 ($M_B$) in the figure) assembling NaCl-type lattices are three-dimensionally crosslinked with cyano groups (carbon atoms 222 and nitrogen atoms 223). As the metallic atoms of $M_A$ and $M_B$, various metals other than an iron atom can be used. The character such as magnetism, electrochemistry, or optical responsiveness can be varied, by the substitution of the metallic atoms (referring to Patent Literature 1).

Downsizing of particles of the Prussian blue-type metal complex plays an important role in an attempt to put the metal complex into practical use. Such downsizing can improve the dispersibility of the metal complex in a solvent. As the dispersibility improves, an inexpensive and high quality film formation method can be employed, such as spin coating and fine processing using various printing methods. As a result, it can be expected the application including a biosensor, a display device, and the like is expanded. Such materials as described below have been reported as magnetic materials: a material that expresses its magnetism at room temperature; and a material the magnetism of which can be regulated by an external stimulus such as irradiation with light or the application of a pressure. The materials are assumed to find use in a wide variety of applications when the materials are turned into nanoparticles. Investigations have been conducted on the application of the magnetic nanoparticles of oxides to memory devices and biomaterials, and the Prussian blue-type metal complex is also assumed to find use widely in the same applications.

There have been a few proposals these years as to the method to produce Prussian blue-type metal complex. For stabilizing fine particles, it is effective to cover the fine particle with molecules. As the molecules for stabilizing ultrafine-particles, which has been practically employed so far, there are a surface active agent (used in an inverted micelle method) of AOT (di-2-ethylhexylsulfosuccinate sodium salt) or the like, a water soluble polymer of poly (vinylpyrrolidone) (PVP)(referring to Patent Literature 2) or the like, a protein of ferritin (referring to Non Patent Literature 1) or the like, and a relatively low molecular weight molecule containing an amino group like oleylamine (Patent Literatures 3,4).

As a method of fixing a Prussian blue-type metal complex on a substrate, electrolytic deposition by which a thin film is obtained has been generally employed so far (referring to, for example, Patent Literature 5). However, this method is not carried out by using fine particles. As a result, characteristic properties of the fine particles can not be used by the method. Further, the electrolytic deposition has such problems that microfabrication is difficult to be conducted and a large scale equipment is needed to produce a large number of films at the same time. In addition, a method of forming layers of Prussian blue-type metal complex particles in a layer-by-layer manner by holding a binder layer other than a metal complex between the layers of Prussian blue-type metal complex particles is disclosed (referring to Non Patent Literature 2). However, this method is extremely low efficient in production, and particularly formation of a thick film is difficult. In the case in which a water-soluble high-molecular compound binder is used as described in Patent Literature 2, water stability is not expected. Further, if a substantial amount of the binder component other than a metal complex is incorporated therein, properties of the Prussian blue-type metal complex such as electric response are affected thereby.

CITATION LIST

Patent Literature

[Patent Literature 1] JP-A-7-270831 ("JP-A" means unexamined published Japanese patent application)
[Patent Literature 2] JP-A-H01-219723
[Patent Literature 3] JP-A-2006-256954
[Patent Literature 4] WO 2007/020945 pamphlet
[Patent Literature 5] JP-A-59-164383

Non Patent Literature

[Non patent Literature 1] M. Yamada et al.: J. Am. Chem. Soc., Vol. 126, 2004, p 9482.
[Non patent Literature 2] D. M. Delongchamp et al. Chem. Mater., Vol. 16, 2004, p 4799

SUMMARY OF INVENTION

Technical Problem

Previously, the present inventors have found that Prussian blue-type metal complex crystals are subjected to a surface treatment with a specific ion or the like thereby obtaining water-dispersible nanoparticles (nanometer-size fine particles) (referring to the specification of Japanese Patent Application 2006-355513 and WO 2008/081923 pamphlet). By this, Prussian blue-type metal complex nanoparticles can be produced efficiently with high purity. Further, core/shell type or multilayer type nanoparticles can be constructed by sequentially performing the above-described surface treatment. Further, a large quantity of nanoparticles can be produced simply and easily, which gives also a great advantage on industrial applications. Especially, a dispersion liquid of the Prussian blue-type metal complex nanoparticles dispersed in water, methanol or the like can be obtained without cumbersome steps, so that the use of this dispersion liquid makes it possible to obtain efficiently a thin film by a method of processing such as film coating or printing. Further, because a specific organic solvent is not needed, this method is excellent in both handleability and environmental suitability. Further, a microfabricated product can be produced. As a result, by using this thin film or microfabricated product, a dimmer control, a display device, or the like can be produced.

However, the thin film or the microfabricated product obtained by simply using the Prussian blue-type metal complex nanoparticles according to the above-described method is peeled from a substrate by contact with water, which needs to impart stability to the film.

Thus, the present invention aims to address problems peculiar to a structural element produced by using water-dispersible Prussian blue-type metal complex nanoparticles. Namely, the present invention aims to provide a method of producing a structural member of Prussian blue-type metal complex nanoparticles, whereby the structural member can be formed so as to have a thin film or a multilayer of the thin film produced without both cumbersome steps and the use of an excessive amount of raw materials by using advantage of the water-dispersible Prussian blue-type metal complex nanoparticles, or the structural member in which these films are subjected to microfabrication can be formed, and stability is given to the structural member in a manner such that these films are suppressed or prevented from peeling from a substrate by contact with water or the like. Further, the present invention aims to provide a structural member obtained by this method, a structural member-provided board, a rectifying device, a photo responsive device and an electrochromic device, each of which uses this structural member.

Solution to Problem

The above objects are achieved by the following means:
(1) A method of producing a structural member having Prussian blue-type metal complex nanoparticles, having the steps of:
providing nanoparticles consisting of Prussian blue-type metal complex onto a substrate,
stabilizing the nanoparticles in accordance with a step selected from the following a to d,
a: providing a surface of the substrate to be provided with the nanoparticles, the surface comprising an atom $M_S$ having the work function of 4.5 eV or more;
b: giving an electrochemical treatment to the nanoparticles;
c: giving a treatment by an agent containing an ion of a metal or metal complex to the nanoparticles;
d: giving a heat treatment to the nanoparticles.
(2) The method of producing a structural member described in (1), wherein the above-described nanoparticles are provided in the form of a dispersion liquid of the nanoparticles dispersed in a medium including a water medium or an alcoholic solvent, and the dispersion liquid is coated on the above-described substrate and then the medium is removed by drying to provide the nanoparticles on the substrate.
(3) The method of producing a structural member described in (1) or (2), wherein, in the ion of the above-described metal or metal complex, the ion of the metal is a cation of the following metal atom $M_E$, and the ion of the metal complex is a metal complex anion including the following metal atom $M_F$.
[The above-described metal atom $M_E$ is one kind or two or more kinds of metal atoms selected from the group consisting of vanadium, chromium, manganese, iron, ruthenium, cobalt, rhodium, nickel, palladium, platinum, copper, silver, zinc, lanthanum, europium, gadolinium, ruthenium, barium, strontium, and calcium. The metal atom $M_F$ is one kind or two or more kinds of metal atoms selected from the group consisting of vanadium, chromium, molybdenum, tungsten, manganese, iron, ruthenium, cobalt, nickel, platinum, and copper]
(4) The method of producing a structural member described in any one item of (1) to (3), wherein the kind of the above-described metal atom $M_S$, the above-described metal atom $M_E$ and/or the above-described metal atom $M_F$ are changed to alter optical properties of the Prussian blue-type metal complex nanoparticles.
(5) The method of producing a structural member having the Prussian blue-type metal complex nanoparticles described in any one item of (1) to (4), wherein the provision of the stabilized structural member is repeatedly conducted to form a multilayered structural member.
(6) The method of producing a structural member having the Prussian blue-type metal complex nanoparticles described in any one item of (1) to (4), wherein the stabilized structural member is combined with a member other than the stabilized structural member to form a multilayered or molded structural member.
(7) A structural member having Prussian blue-type metal complex nanoparticles, comprising:
a substrate,
nanoparticles consisting of Prussian blue-type metal complex provided onto the substrate, the nanoparticles having been dispersible to water, but the nanoparticles being stabilized against water in accordance with one selected from the following e to h,
e: the substrate having a surface to be provided with the nanoparticles, the surface comprising an atom $M_S$ having the work function of 4.5 eV or more;
f: the nao-particles subjected to an electrochemical treatment;
g: the nao-particles subjected to a treatment by an agent containing an ion of a metal or metal complex;
h: the nanoparticles subjected to a heat treatment.
(8) The structural member described in (7), wherein the average particle diameter of the above-described nanoparticles is 500 nm or less.
(9) The structural member described in (7) or (8), wherein the structural member is formed by coating a dispersion liquid of the above-described water-dispersible nanoparticles dispersed in a medium including a water medium or an alcoholic solvent on the above-described substrate, and then removing the medium by drying.
(10) The structural member described in any one item of (7) to (9), wherein, in the ion of the above-described metal or metal complex, the ion of the metal is a cation of the following metal atom $M_E$, and the ion of the metal complex is a metal complex anion including the following metal atom $M_F$.

[The above-described metal atom $M_E$ is one kind or two or more kinds of metal atoms selected from the group consisting of vanadium, chromium, manganese, iron, ruthenium, cobalt, rhodium, nickel, palladium, platinum, copper, silver, zinc, lanthanum, europium, gadolinium, ruthenium, barium, strontium, and calcium. The metal atom $M_E$ is one kind or two or more kinds of metal atoms selected from the group consisting of vanadium, chromium, molybdenum, tungsten, manganese, iron, ruthenium, cobalt, nickel, platinum, and copper]

(11) The structural member described in any one item of (7) to (9), wherein the Prussian blue-type metal complex nanoparticles have optical properties altered by changing a kind of the above-described metal atom $M_S$, the above-described metal atom $M_E$ and/or the above-described metal atom $M_F$.

(12) The structural member described in any one item of (7) to (11), wherein a layer of Prussian blue-type metal complex nanoparticles is multilayered on a layer of the stabilized Prussian blue-type metal complex nanoparticles.

(13) The structural member described in (12), wherein the above-described multilayer contains a different kind of Prussian blue-type metal complex nanoparticles between one layer and another layer or other layers.

(14) The structural member described in any one item of (7) to (13), wherein the above-described structural member is multilayered or molded by combining with al member other than the above-described structural member.

(15) The structural member described in any one item of (7) to (14), wherein the above-described structural member exhibits an electrochemical response.

(16) A structural member-provided board including a board-shape substrate as the above-described substrate and the structural member having Prussian blue-type metal complex nanoparticles, described in any one item of (7) to (15), provided on at least one side of the board.

(17) An electrochromic device equipped with the structural member-provided board described in (16).

(18) A rectifying device equipped with a structural member having a thin layer of the above-described multilayered Prussian blue-type metal complex nanoparticles described in any one item of (12) to (14).

(19) A photo responding device equipped with a structural member having a thin layer of the above-described multilayered Prussian blue-type metal complex nanoparticles described in any one item of (12) to (14).

Advantageous Effect of Invention

According to the production method of the present invention, excellent effects are achieved such that it is possible to form a structural member having Prussian blue-type metal complex nanoparticles, manufactured to a film such as a thin film or a multilayer of the thin film, or a microfabricated structural member thereof without both cumbersome steps and the use of an excessive amount of raw materials by using advantage of the water-dispersible dispersion element; and it is possible to give stability to the produced structural member in a manner such that the structural member are suppressed or prevented from peeling from a substrate by contact with water or the like. Further according to the production method of the present invention, the structural member having Prussian blue-type metal complex nanoparticles and having the above-described excellent properties can be produced efficiently with high purity.

Further, as the Prussian blue-type metal complex nanoparticles in the above-described structural member, it is possible to use bottom-up type nanoparticles in which individual atoms or molecules are built upon each other. Further, if needed, a thin film or a microfabricated product of the core/shell structural fine particles may be produced. Thus, it is possible to finely regulate or control properties such as coloring property and electrochemical response by designing of the above-described fine particle structure and, if needed, by selecting metal atoms that are used for a treatment of a substrate and fine particles.

Further, the structural member-provided board, and the electrochromic device, the rectifying device and the photo responsive device, all of which are the present invention each, have a high degree of freedom of designing because they can be made in the form of a thin film or they can be microfabricated if needed. In addition, they exhibit high performance in terms of excellent coloring property, electrochemical response, response speed, reversible changeability of color, rectifying property and the like, originated from a fine-grained Prussian blue-type metal complex having a nanometer size.

BRIEF DESCRIPTION OF DRAWINGS

FIG. 14-1 shows a change of transmittance of the thin film of the nickel Prussian blue complex analog (Prussian blue shell structure) obtained in Example 8, at the case of yellow color during electrochemical measurement thereof.

FIG. 14-2 shows a transmittance of the thin film of the nickel Prussian blue complex analog (Prussian blue shell structure) obtained in Example 8, at the case of transparency during electrochemical measurement thereof.

DESCRIPTION OF EMBODIMENTS

Figure 1:
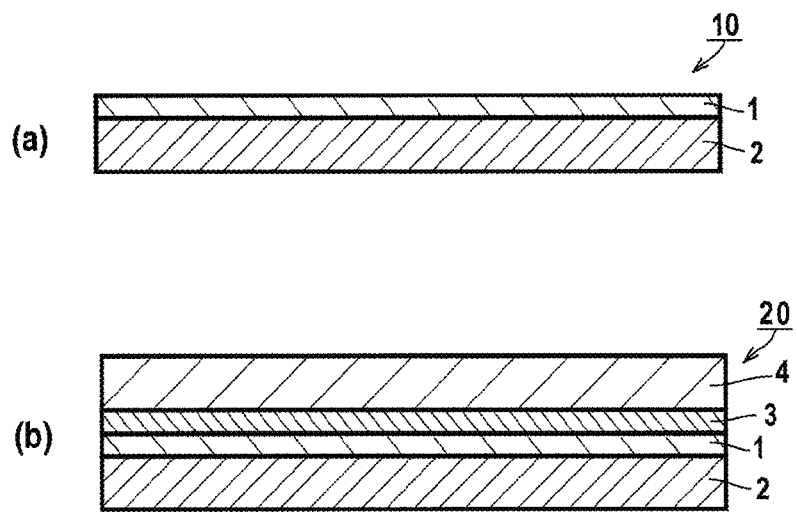
FIG. 1 is a sectional view showing schematically a structural member having a thin film including Prussian blue-type metal complex nanoparticles, that is one of preferable embodiments of the present invention, in which (a) shows a structural member having a single layer of the thin film, and (b) shows a structural member having two layers of the thin film, which constitutes a device.

In a preferable embodiment of the production method of the present invention, there are the following three main processes of production.
Process (1): Production of water-dispersible Prussian blue-type metal complex nanoparticles
Process (2): Production of structural member such as a thin film by using the nanoparticles produced in the process (1)
Process (3): Giving of stability to the structural member produced in the process (2)
Hereinafter, the processes (1) to (3) in the above-described embodiment are explained in detail in sequence. However, the present invention is not construed as being limited to the processes (1) to (3). In the present invention, "Prussian blue-type metal complex" is defined as a metal complex in which a cyano group CN forms a bridge between the following metal atom $M_A$ and metal atom $M_B$. This may be referred to as a Prussian blue-type metal complex analog (PBA).
Production Process (1)

In the production process (1) of this embodiment, crystals of the Prussian blue-type metal complex in which a cyano group CN forms a bridge between the metal atom $M_A$ and the metal atom $M_B$ are subjected to a surface treatment with a metal cyano complex anion including a metal atom $M_C$ as a central metal and/or with a metal ion $M_D$, and preferably the crystals are coated with these ions, thereby producing a water-dispersible Prussian blue-type metal complex nanoparticle. In the present invention, as mentioned above, the property of dispersibility in water is referred to as "water-dispersible". For example, it is preferable that even after one day still standing of a dispersion element, particles therein do not precipitate. Herein, the metal atoms $M_A$, $M_B$, $M_C$, and $M_D$ may be the same or different from each other. Further, it is not necessary for the metal atoms $M_C$ and $M_D$ to be coated in the production process of Prussian blue-type metal complex nanoparticles, but it is favorable that finally obtained fine particles are treated with the above-described metal atoms and preferably have a coating structure that is constructed by the above-described metal atoms. Further, coating of the metal atoms $M_C$ and/or $M_D$ is not necessarily carried out uniformly and completely on the crystal surface. For example, one third (⅓) or more of a total area of the crystal surface is preferably coated. Further, other materials may be adsorbed on the surface to enhance dispersibility with respect to other solvents and to improve photo response and the like. For example, coordination may be used by adding a ligand described in Japanese Patent Application No. 2006-355513 (WO 2008/081923 pamphlet), the ligand being described below.

The metal atom $M_A$ is at least one metal atom, or two or more metal atoms, selected from the group consisting of vanadium, chromium, molybdenum, tungsten, manganese, iron, ruthenium, cobalt, nickel, platinum, and copper. Among those, as the metal atom $M_A$, iron, chromium, or cobalt is more preferable, and iron is particularly preferable. In case of including two or more kinds as the metal atom $M_A$, the combination of iron and chromium, the combination of iron and cobalt, the combination of chromium and cobalt are preferable, and the combination of iron and chromium is more preferable. Further, in case of including two or more kinds of metals of $M_A$, they may uniformly be mixed, or may be a bias in which a specific metal is present at the center of the nanoparticle and besides be present another metal close to the surface of the particle.

The metal atom $M_B$ is at least one metal atom, or two or more metal atoms, selected from the group consisting of vanadium, chromium, manganese, iron, ruthenium, cobalt, rhodium, nickel, palladium, platinum, copper, silver, zinc, lanthanum, europium, gadolinium, lutetium, barium, strontium, and calcium. As the metal atom $M_B$, iron, cobalt, nickel, vanadium, copper, manganese, or zinc is preferable, and iron, cobalt, or nickel is further preferable. In case of including two or more kinds as the metal atom $M_B$, the combination of iron and nickel, the combination of iron and cobalt, the combination of nickel and cobalt are preferable, the combination of iron and nickel is more preferable. Further, in case of including two or more kinds of metals of $M_B$, they may uniformly be mixed, or may be a bias in which a specific metal is present at the center of the nanoparticle and besides be present another metal close to the surface of the particle.

Though the production method of such nanoparticles is not particularly limited, sequential lamination method described below is cited as one example of the production method. In the sequential lamination method, first, crystals of Prussian blue-type metal complex in which a cyano group CN forms a bridge between metal atom $M_A$ and metal atom $M_B$ are produced. According to a specific production method, an aqueous solution containing a metal cyano complex anion including the metal atom $M_A$ as a central metal and an aqueous solution containing a cation of the metal atom $M_B$ are mixed to precipitate crystals of Prussian blue-type metal complex including the metal atom $M_A$ and the metal atom $M_B$. Herein, the metal atom $M_A$ and the metal atom $M_B$ may be the same or different from each other.

The mixing ratio of the metal cyano complex including the metal atom $M_A$ as a central metal and the metal cation of the metal atom $M_B$ is not particularly limited. However, they are preferably mixed so that $[M_A: M_B]$ is in the range of from 1:1 to 1:1.5 in terms of molar ratio.

In the production method of the present invention, the crystal size of Prussian blue-type metal complex obtained in this process greatly influences the diameter of the finally obtained nanoparticles. Accordingly, the diameter of the finally obtained nanoparticles can be controlled by mixing a particle size controlling agent for controlling the size of the crystal size of Prussian blue-type metal complex at the time of production. As the particle size controlling agent, for example, ammonia is preferred.

A counter ion in the aqueous solution containing a metal cyano complex anion including the metal atom $M_A$ as a central metal is not particularly limited, and examples of the counter ion include a potassium ion, an ammonium ion, a sodium ion, a lithium ion, a cesium ion, and a rubidium ion. A counter ion in the aqueous solution of the metal atom $M_B$ is not particularly limited, and examples of the counter ion include $Cr$, $NO_3^-$, and $SO_4^{2-}$.

In the production method of forming layers one after another, Prussian blue-type metal complex nanoparticles are obtained by mixing the Prussian blue-type metal complex obtained as described above with an aqueous solution containing a metal cyano complex anion using the metal atom $M_C$ as a central metal and/or an aqueous solution containing a cation of the metal atom $M_D$. With such procedure, the surface of each fine particle can be charged in a desired fashion.

In general, as the reason of particles being solved in a solvent, it can be said that the particles are charged superficially. In case of particles being charged, they may have an affinity with a solvent having a high polarity like water and the like, and consequently they can be dispersed therein. It should be noted that the above-mentioned surface of each fine particle may be "positively" charged, or may be "negatively" charged. To be more specific, an electrostatic repulsive interaction is caused to act between the nanoparticles to prevent the aggregation of the nanoparticles in a solvent. As a result, the nanoparticles can be dispersed in the solvent. Water is particularly preferably utilized as the solvent because water molecules each have polarity. When the nanoparticles are turned into fine particles dispersible in water (water-dispersible fine particles) as described above, the fine particles can be dissolved or dispersed in, for example, an aqueous medium (such as water, a mixed liquid of water and an alcohol, or an aqueous solution of an inorganic salt such as hydrochloric acid or an aqueous solution of sodium hydroxide) or a polar solvent such as an alcohol.

In view of dispersibility with respect to the polar solvent as described above, it is preferred that the nanoparticles used in the present invention have a large surface area and have a large enough exposed area charged with any one of the metal cyano complex anion including the metal atom $M_C$ as described above and the metal ion of the metal atom $M_D$ as described above. Specifically, it is desirable that the surface exposed area of the above-described metal atom or the complex thereof is one third (⅓) or more of the total.

Here, the metal atom $M_C$ is one kind or two or more kinds of metal atoms selected from the group consisting of vanadium, chromium, molybdenum, tungsten, manganese, iron, ruthenium, cobalt, nickel, platinum, and copper. The preferable range thereof and counter ions thereof are the same as those described in the metal atom $M_A$.

The metal atom $M_D$ is one kind or two or more kinds of metal atoms selected from the group consisting of vanadium, chromium, manganese, iron, ruthenium, cobalt, rhodium, nickel, palladium, platinum, copper, silver, zinc, lanthanum, europium, gadolinium, lutecium, barium, strontium, and calcium. The preferable range thereof and counter ions thereof are the same as those described in the metal atom $M_B$.

The cyano complex anion of the metal atom $M_A$ or $M_C$ is preferably a hexacyano metal complex anion. In ordinary cases, the hexacyano metal complex anion is of such a shape that a metal atom is surrounded with six cyano groups; a part of the cyano groups may be substituted by other molecules, and the number of cyano groups may range from 4 to 8. Further, the part of cyano groups may be including 1 to 3 metal complex anion(s).

The Prussian blue-type metal complex adopts such a structure that the cation of the metal atom $M_B$ and the hexacyano metal complex anion composed of the central metal $M_A$ are alternately combined. In the following description, the metal cation and hexacyano metal complex anion of which the metal complex is constituted are represented by $B^+$ and $A^-$, respectively. It should be noted that the Prussian blue-type metal complex crystal may have vacancies, and is not requested to be a perfect crystal. In addition, the crystal may be a composite crystal in which multiple different metal cations $B^+$ and multiple different hexacyano metal complex anions $A^+$ are combined. The Prussian blue-type metal complex crystal before surface modification is referred to as "core portion".

An embodiment of the nanoparticles used in the present invention is, for example, such that the metal atoms $M_A$ and $M_B$ of which the core portion is constituted and metal atoms $M_C$ and $M_D$ to be further added are metal atoms identical to one another. Another embodiment is, for example, such that metals different from the metal atoms $M_A$ and $M_B$ of which the core portion is constituted are selected and used as the metal atoms $M_C$ and $M_D$ to be further added. To be specific, for example, a metal cation $D^+$ is further added to the Prussian blue-type metal complex (core portion) composed of the cation $B^+$ and the anion $A^-$. As a result, the $A^-$ on the surface of the core portion is coated with the $D^+$, and the $B^+$ or $D^+$ is exposed to the surface, whereby the surface of each fine particle is "positively" charged. Then, the metal composition of the entire fine particle becomes no longer uniform, whereby a nanoparticle having a layer formed of a metal different from those of the core portion on the surface side can be produced. When a hexacyano metal complex anion $C^-$ different from that of the core portion is further added after the production, the $C^-$ is stacked so as to coat the $B^+$ and $D^+$ described above. That is, an outer layer portion composed of the $D^+$ and $C^-$ different from those of the core portion is formed. Thus, a nanoparticle of such a structure as to have the core portion ($A^-$ and $B^+$) and the shell portion ($C^-$ and $D^+$) in the Prussian blue-type metal complex can be produced.

Thus, the nanoparticle used in the present invention may be a nanoparticle of having layered form piled up atoms or molecules, in the prescribed order, as to metal cation and hexacyano metal complex anion to organize the shell portion. When a fine particle having a multilayer structure is produced by providing a shell portion having multiple layers, the respective shell portions may be identical to or different from each other in metal composition.

The term "nanoparticles" as used in the present invention refers to particles which are fined to have sizes of the order of $10^{-9}$ m, and which can be dispersed in, and isolated from and re-dispersed in, various solvents in a nanoparticle state, i.e., which are discrete particles (particles that cannot be isolated from a dispersoid or dispersion and particles that cannot be isolated from and re-dispersed in the dispersoid or dispersion are not included in the category of the "nanoparticles"). The nanoparticles have an average particle size of preferably 500 nm or less, preferably 200 nm or less, or more preferably 50 nm or less. The lower limit is not limited, but it is practical of being 3 nm or more.

The term "particle size" as used in the present invention refers to the diameter of a primary particle free of any such protecting ligand as described later unless otherwise stated; the term refers to the circle-equivalent diameter of the particle (value calculated from the image of each ultrafine particle obtained by observation with an electron microscope or scanning microscope as the diameter of a circle equivalent to the projected area of the particle). The term "average particle size" refers to the average of the particle sizes of at least 30 ultrafine particles measured as described above unless otherwise stated. Alternatively, the average particle size may be estimated from an average size calculated from the half width of a signal obtained by the powder X-ray diffraction (XRD) measurement of an ultrafine particle powder, or may be estimated from dynamic light scattering measurement; provided that, when the average particle size is measured by the dynamic light scattering measurement. In this regards, attention must be paid to the fact that the resultant particle size may be obtained as that including a protecting ligand.

It should be noted that, in a state where the nanoparticles are dispersed in a solvent, two or more of the nanoparticles collectively behave as a secondary particle, and an additionally large average particle size may be observed depending on a method for the measurement of the average particle size and the environment thereof; when the ultrafine particles in a dispersed state serve as secondary particles, the average particle size of the secondary particles is preferably 200 nm or less. It should be noted that an additionally large aggregate may be formed by, for example, the removal of a protecting ligand as a result of, for example, a treatment after the formation of an ultrafine particle film, and the present invention should not be construed as being imitative owing to the formation of the aggregate.

In the production process of the above-described embodiment, the Prussian blue-type metal complex nanoparticles are obtained in the state of dispersion in mixed liquid. However, for example, the nanoparticles can be reduced to a powder of fine particles by separating the solvent from the mixed liquid by means of distillation under reduced pressure, filtration, centrifugation, or the like.

Further, at producing the Prussian blue-type metal complex nanoparticle, additives may be added for giving the other characteristics to the nanoparticle. For example, the optical properties of the product can be controlled by the addition of the ammonia, pyridine, or their combination as an agent for controlling the optical properties. The optical properties can be preferably controlled by the presence or absence or amount of the addition agent.

As the organic ligand which can be used in the present invention, one or two or more compounds having a pyridyl group or an amino group as a binding portion (preferably a compound having 2 or more and 100 or less carbon atoms, more preferably a compound having 4 or more and 100 or less carbon atoms). are preferable to use one or two or more compound(s) represented by any one of the following formulae (1) to (3).

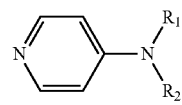

Formula (1)

In formula (1), $R_1$ and $R_2$ each independently represents a hydrogen atom, or an alkyl group, alkenyl group or alkynyl group, each having 8 or more carbon atoms (preferably having 12 to 18 carbon atoms). $R_1$ and $R_2$ are preferably an alkenyl group, in which there is no upper limit on the number of carbon-carbon double bonds therein, it is preferable that the number is 2 or less. When the ligand L having an alkenyl group is used, the dispersibility can be improved even when the compound is hard to disperse in a solvent other than a polar solvent (excluding methanol and acetone from which a ligand may be eliminated, e.g., chloroform). Specifically, using a ligand having an alkenyl group, the resultant compound can favorably disperse in a nonpolar solvent (e.g., hexane), unless the ligand is eliminated. This is the same as in the cases of $R_3$ and $R_4$. Among the compounds represented by formula (1), 4-di-octadecylaminopyridine, 4-octadecylaminopyridine, and the like are preferable.

Formula (2)

In formula (2), $R_3$ represents an alkyl group, alkenyl group or alkynyl group, each having 2 or more carbon atoms (preferably having 8 to 18 carbon atoms, more preferable 12 to 18). $R_3$ is preferably an alkenyl group. Although there is no upper limit on the number of carbon-carbon double bonds, it is preferable that the number is 2 or less. Among the compounds represented by formula (2), oleylamine is preferable as a ligand having an alkenyl group, and stearylamine is preferable as a ligand having an alkyl group.

Formula (3)

In formula (3), $R_4$ represents an alkyl group, alkenyl group or alkynyl group, each having 6 or more carbon atoms (preferably having 12 to 18 carbon atoms), and $R_5$ represents an alkyl group, an alkenyl group, or an alkynyl group (each preferably having 1 to 60 carbon atoms). It is preferable that $R_4$ be an alkenyl group. There is no upper limit on the number of carbon-carbon double bonds, and it is preferable that the number be 2 or lower.

Meanwhile, the compounds represented by formula (1), (2), or (3) may have a substituent, unless the effects of this invention are obstructed.

Production Process (2)

In the production process (2) of the present embodiment, a structural member is produced using the Prussian blue-type metal complex nanoparticles produced in the production process (1). In the present invention, the structural member having the nanoparticles is a film as an example. In addition, the structural member includes a variety of microfabricated forms. Accordingly, the structural member may be fabricated into a desired microscopic form such as a dot-like form. Further, as a substrate on which the structural member having the nanoparticles is provided, the structural member is preferably provided on a board-shape substrate. However, the substrate for the structural member is not limited thereto. For example, the structural member may be provided on a wall surface of goods, building materials and the like as a substrate. Especially, it is preferable for the shape of the structural member having Prussian blue-type nanoparticles of the present invention to be in the form of a thin film. However the present invention is not limited thereto. In a case in which the structural member is a thin film, for example, the thickness is preferably controlled so as to be in the range of from 0.01 μm to 10 μm, and more preferably from 0.05 μm to 1 μm. The content of the Prussian blue-type metal complex nanoparticles in the structural member is not particularly limited. However, from the viewpoint of directly bringing out electrical properties and the like of the nanoparticles and using the same, it is preferable that the content of components other than both a treatment agent described below and inevitable materials such as metal atoms and the like on a substrate is small enough. The content of the nanoparticles is preferably from 30% by mass to 100% by mass, and more preferably from 60% by mass to 100% by mass. Further, the structural member may contain two or more different kinds of Prussian blue-type metal complex nanoparticles. Alternatively, two or more layers containing different kinds of Prussian blue-type metal complex nanoparticles may be laminated. In this case, there is no need for the shape of the two or more laminate layers to be identical.

In the production of the structural member, it is preferred to use a dispersion liquid of the Prussian blue-type metal complex nanoparticles produced in the above-described process (1). Specifically, for example, various kinds of film production techniques and printing techniques are used to fabricate it. However, the production method of the present invention is not limited thereto.

Examples of the printing techniques used in the present invention, in which the dispersion liquid of the nanoparticles is used, include an ink jet process, a screen printing method, a gravure printing method, a flexographic printing method, and a relief printing method. Examples of the film production techniques include a spin coat method, a bar coat method, a squeegee method, a Langmuir-Blodgett method, a cast method, a spray method, and a dip coat method. Further, a method of using a chemical bond between a substrate and nanoparticles may be used. By these methods, the dispersion liquid can be used for fabrication of various devices or the like.

In the dispersion liquid of the Prussian blue-type metal complex nanoparticles, an aqueous medium or alcohol is preferred as a medium thereof. The medium may be water, methanol, ethylene glycol, or the like, or may be a mixed liquid thereof. Further, in order to adjust various properties such as viscosity and surface tension, other components such as a resin may be contained in the dispersion liquid. A content of the Prussian blue-type metal complex nanoparticles in the dispersion liquid is not particularly limited. For example, the content is preferably from 1 to 50% by mass, and more preferably from 5 to 50% by mass.

Production Process (3)

The production process (3) is a process for stabilization of the structural member having Prussian blue-type nanoparticles obtained by the production process (2). Specifically the "stabilization" refers to the situation in which a shape of the structural member is insusceptible to an external stimulus. For example, the "stabilization" refers to the situation in which, when water is attached to a structural member, or the structural member is immersed in water, a property of maintaining a form of a thin film or a microfabricated product is enhanced as a result of suppression or prevention of a part of or a substantial part of the structural member from being destroyed, being peeled from a substrate, being dissolved, or being scattered and lost due to re-dispersion. Herein, technical meanings of the stabilization in the present invention are described. Generally, the thin film produced from nanoparticles has a structure in which nanoparticles are multilayered on a substrate. The structure member may be susceptible to attachment of a liquid or collision with another material, or the like. Especially, the structure member having water-dispersible nanoparticles without modification, if immersed in water, may cause a problem such as peeling and dispersion. For the purpose of directly developing electrochemical properties which the Prussian blue-type metal complex nanoparticles have, it is not preferable to add a binder or the like for improving stability in an excess amount. However, in the nanoparticle structure member free from a binder or the like, if the nanoparticles are water-dispersible, they get to re-dispersion by contact with water or immersion into water. As a result, the structure member has difficulty in maintaining a form thereof. Accordingly, a medium primarily including water can not be used as an electrolytic solution which is brought to contact with the structure member without modification. As a result, the structure of a device and the kind of a material that can be used are forced to be extremely limited.

In the case of metal nanoparticles or the like, stabilization may be achieved by burning and removing organic materials such as a surface preparation agent by means of high-temperature sintering, and further by producing a bond between the nanoparticles. In contrast, with respect to the structural member having Prussian blue-type nanoparticles, there is a possibility that the nanoparticles themselves are oxidized and decomposed by heating at 300° C. or more, though the temperature may vary depending on a material thereof. As a result, stabilization by means of high-temperature sintering is difficult, so that the method of the present invention is extremely effective.

According to the present invention, as a result of stabilization of the structural member having Prussian blue-type metal complex nanoparticles in which a shape of the structural member is maintained even in water, it is possible to make an electrochemical device in which the structural member is combined with an electrolytic solution including water as a primary medium. As a result, the present invention has various advantages such as production cost, durability of the device, and enrichment of material choice. Further, obviously an aqueous medium is insusceptible to environment compared to a special organic medium, which may make the device environment-responsive. Further according to the present invention, the above-mentioned stabilization can be realized without using a large quantity of binder or the like. As a result, characteristic features which the Prussian blue-type metal complex nanoparticles have can be directly elicited without deterioration, and if needed, electrochemical characteristics and optical characteristics can be adjusted or controlled desirably.

The "stabilization" in the present invention has a meaning as described above. Further, when the "water stability" or "stability-in-water" is mentioned, these words mean that when water is attached to a structural member, or the structural member is immersed in water, a property of maintaining a form of a thin film or a microfabricated product is enhanced as a result of suppression or prevention of a part of or a substantial part of the structural member from being destroyed, being peeled from a substrate, being dissolved, or being scattered and lost due to re-dispersion. In the present invention, imparting of the stability in water is referred to as "stabilization in water".

Further in the present invention, as a result of giving of water-contact stability to a structural member as mentioned above, for example, a production process and a stabilization process of the structural member are carried out one after another in the time of producing the structural member whereby a laminated structure or a three-dimensionally molded structural member can be produced. It is difficult to obtain this structural member by a conventional structural member to which stability has not been given, or a production method of the conventional structural member. In the conventional production method, for example, in the case in which a thick film is produced by a spin coat method, if the thick film is produced at a time, peeling or the like may be seen in the drying process. Even though film production is carried out by forming a thin film of less than the prescribed thickness followed by repetition of the thin film formation, the previously-formed film lacks in stability. Accordingly, water (moisture) in a coating film provided subsequently is brought to contact with the previously-formed film. Resultantly, peeling or the like is caused in the formed films. In contrast, according to the present invention, a structural member (for example, a film) having a desired thickness has been stabilized. By laminating these structural members, heap of the structural members having a certain height from a substrate, for example, a thick film can be formed. Further, it is also possible to produce a multilayered film or a three-dimensional structural member in which a stabilized structural member (for example, a film) and another member different from this stabilized structural member are combined. Further, adhesion between the film and a substrate, and film strength are improved by application of the present invention, so that precision of the subsequent microfabrication can be also enhanced. For example, in the case of carrying out microfabrication according to photolithography, application of the present invention enables to prepare a desired pattern with a high degree of precision.

In the present invention, a degree of stabilization-in-water is not particularly limited; however, it is preferred that peeling or the like is not visually observed after setting the structural member in water then take it out of water quickly. More specifically, the degree of stabilization in water can be evaluated as follows. A filmy sample (thickness: 0.2 μm) of nanoparticle structural member is formed allover on one side of a substrate of 25×25 mm. Then, this is immersed in distilled water and then subjected to still standing for 10 minutes. Thereafter, the sample is slowly boosted out of water to take it out of water. The mass of the thus-treated structural member of the sample is measured. It is preferred that 95% by mass or more of the sample prior to immersing is remaining. However, by this evaluation, the structural member of the present invention is not construed to be limited to the embodiment in which it is used in water.

Examples of the method of stabilizing a structural member in water include (3-1) a method of providing a structural member on a specific substrate, (3-2) a method of electrochemically processing a structural member, (3-3) a method of processing a structural member with a specific agent, and (3-4) a heating method (preferably heating at a relatively low temperature of 200° C. or less). Hereinafter, details of each method are explained.

(3-1) A Method of Using a Specific Substrate

In the present embodiment, a structural member is formed by providing Prussian blue-type nanoparticles: on a substrate made of atom Ms having the work function of 4.5 eV or more, or a substrate having the surface of which is coated with the metallic atom. According to this embodiment, it is possible to enhance stability-in water of the structural member by just providing the above-described nanoparticles on the substrate and still standing for a prescribed period of time. For example, a thin film of Prussian blue-type metal complex is produced on the specific substrate described above by spin coat or the like and the thin film is put still standing for several days in atmosphere. After that, if the thin film is stood in water as it is, peeling or the like is not seen any more.

The above-described atom Ms has the work function of 4.5 eV or more. Specifically, as the atom Ms, selenium (5.8 eV), platinum (5.7 eV), iridium (5.3 eV), gold (5.2 eV), carbon (5.0 eV), palladium (5.2 eV), rhodium (5.0 eV), germanium (5.0 eV), nickel (5.2 eV), cobalt (5.0 eV), rhenium (4.9 eV), tellurium (4.9 eV), osmium (4.8 eV), ruthenium (4.7 eV), berylium (5.0 eV), silicon (4.8 eV), antimony (4.5 eV), tungsten (4.5 eV), chromium (4.5 eV), iron (4.5 eV), copper (4.7 eV), or the like can be used. Among these atoms, metal atoms having the work function of 4.7 eV or more are preferred, and platinum, gold, carbon and palladium are more preferred. Gold is especially preferred. Further, the above-described atom Ms may be alloys made of two or more kinds of metals selected from the above atoms. Moreover, the atom Ms may be a material in which various kinds of additives are incorporated in a mother body of the above-described metal. Any materials that are not an elementary substance, such as oxides or polymers, may be favorable, as long as they meet a prescribed requirement of the work function.

Though presumption is contained in part, a reason for stabilization-in-water that is achieved by using such specific substrate as described above is thought as follows. Namely, in the case of providing a structural member of Prussian blue-type nanoparticles on the substrate which has atom Ms having a high work function at least on a surface thereof, electrons tends to be easily transferred from the structural member of Prussian blue-type nanoparticles to the atom Ms. It is thought because an electronic state of the structural member of Prussian blue-type nanoparticles is changed by this, so that a binding mode of nanoparticles is more rigidly-reconstituted. However, because the work function of the atom Ms is heavily dependent on, for example, exposed surface structure and extraneous matter, these elements may affect the work function.

After providing a structural member on a substrate having the above-described atom Ms at least on the surface thereof, the period of time for still standing is preferably 1 hour or more, further preferably 12 hours or more, and especially preferably 24 hours or more. The place for still standing is preferably a place to which light such as sunlight or generic illumination is irradiated. However, even a place to which light is not irradiated, such as a dark room, is no problem. It is desirable that the temperature of the place for still standing is from 10° C. to 30° C. and the humidity thereof is from 30% to 80%. However, these are not restrictive.

(3-2) A Method of Electrochemically Processing a Structural Member

In the present embodiment, Prussian blue-type metal complex nanoparticles are subjected to an electrochemical processing. Preferably, at first a structural member precursor of the Prussian blue-type metal complex nanoparticles provided on a substrate is prepared, and then the structural member precursor is subjected to an electrochemical processing whereby its stability-in-water can be enhanced. More specifically, a potential of the structural member the Prussian blue-type metal complex nanoparticles is controlled in an electrolyte to change its oxidation number whereby its stability-in-water can be enhanced and controlled.

In the present embodiment, in the case of using a substrate, its shape and material are not particularly limited. Any substrate may be used as long as the structural member of Prussian blue-type metal complex nanoparticle can be formed on the substrate. Further, a laminar shape is not needed. In order to conduct the electrochemical processing in the present embodiment, it is preferred for the substrate to have a conductive property. In the case of using a substrate having no conductive property, it is preferred to provide separately, on the substrate, a wiring or the like using a conductive material for changing oxidation number of the structural member of Prussian blue-type metal complex nanoparticles.

As the substrate to be used, specifically, a substrate made of one selected from selenium, platinum, iridium, gold, carbon, palladium, rhodium, germanium, nickel, cobalt, rhenium, tellurium, osmium, ruthenium, berylium, silicon, antimony, tungsten, chromium, iron, tin oxide, iridium tin oxide (ITO), zinc oxide (ZnO), polyethylene dioxythiophene (PEDOT), polystyrene sulfonic acid (PSS), or polyaniline, or a mixture thereof, or an alloy thereof; or alternatively a substrate a surface of which is coated with these materials is preferred. Especially, gold, copper, ITO, or ZnO is preferred. Gold or ITO is more preferred. However, the substrate used in the present embodiment is not limited thereto.

The electrolyte is not particularly limited. However, it is preferred for the electrolyte to stably exist in an electrolytic solution, even though a structural member precursor of the Prussian blue-type metal complex nanoparticles is immersed with a substrate in the electrolytic solution. The electrolyte ordinarily contains freely-transferable ions inside thereof. There is no restriction on its embodiment, and a liquid, a solid, a gel and the like may be used. In the case of using a liquid, a solution of a supporting electrolyte dissolved in a solvent may be used. In this case, examples of the solvent include one selected from acetonitrile, propylene carbonate, ethylene carbonate, butylene carbonate, γ-butyl lactone, dimethoxy ethane, tetrahydro furan, methyltetrahydro furan, dioxolan, methyl-dioxolan, methyl formate, methyl acetate, methyl propionate, dimethyl carbonate, ethylmethyl carbonate, diethylcarbonate, ethanol, or methanol; or a mixture of these two or more solvents. Among these solvents, acetonitrile, propylene carbonate, ethylene carbonate, or dimethyl carbonate is preferred, and acetonitrile or propylene carbonate is more preferred.

The supporting electrolyte is preferably dissolved in a solvent and further substantially decomposed into cations and anions. Herein, the substantial decomposition refers to a capacity of making it possible to electrochemically change an oxidation number of the structural member of Prussian blue-type metal complex nanoparticles. The supporting electrolyte can be also defined by cation-anion pairs. As the cation in this case, for example, potassium ion, sodium ion, cesium ion, rubidium ion, ammonium ion, and the like may be used. However, the cation is not particularly limited thereto. As the anion, for example, $PF_6$ ion, $ClO_4$ ion, $AsF_6$ ion, $SbF_6$ ion, $CF_3SO_3$ ion, $(CF_3SO_2)_2N$ ion, $C_4F_9SO_3$ ion, $(CF_3SO_2)_2C$ ion, $BPh_4$ ion, or the like may be used. However, the anion is not particularly limited thereto.

A method of conducting an electrochemical processing is not particularly limited. It is preferred to bring about a change in oxidation number of all or a part of the structural member of Prussian blue-type metal complex nanoparticles. As to an apparatus, a method of conducting a general electrochemical processing may be used. For example, in the case of conducting a general processing of three-electrode system, a substrate having provided thereon the structural member of Prussian blue-type metal complex nanoparticles can be used as a working electrode. The counter electrode and the reference electrode are not particularly limited. For example, a platinum electrode may be used as the counter electrode. A saturated Calomel electrode may be used as the reference electrode.

Examples of the methodology of the electrochemical processing include a cyclic voltammetry process in which an electrical potential is repeatedly changed at a jagged pattern. In this case, there is no restriction in repeat count. Stabilization can be achieved even by one application. However, 5 or more repeat counts are preferred, and 20 or more repeat counts are more preferred. As for the electrical potential to be changed, it is preferred that oxidation and reduction are caused by the electrical potential in at least one part of the structural member of Prussian blue-type metal complex nanoparticles. A degree of the potential may be properly determined in accordance with a material to be stabilized. For example, in the case of the structural member of Prussian blue-type nanoparticles, it is preferred that the lower limit potential change of 0 V or less and the upper limit potential change of 0.3 V or more are given in a case in which a saturated Calomel electrode is used as a reference electrode. However, even in a case in which an electrical potential change does not meet this range, if the electrical potential change causes oxidation or reduction in at least one part of the structural member of Prussian blue-type metal complex nanoparticles, setting may be conducted in such potential range.

(3-3) A Method of Processing a Structural Member with a Specific Agent

Stability of the Prussian blue-type metal complex nanoparticles can be also improved by cleaning with a specific agent (chemical), or still standing in solution. In that time, the process is preferred in which a structural member precursor having provided thereon the above-described nanoparticles is constructed, and then the precursor is subjected to the above-described chemical processing. The chemical at that time is preferred in which ions to be attached onto the particle surface of the nanoparticle structural member precursor are stably dispersed. As such chemical, a desired ion-containing solution or an ionic liquid is preferred. As mentioned above, the water-dispersible Prussian blue-type metal complex nanoparticles used in the present embodiment are preferably particles surfaces of which are covered with cations or anions, and as a result the nanoparticle surfaces are charged and exhibit dispersibility in a polar solvent. For example, by eliminating a charge on the nanoparticle surfaces, dispersibility in the polar solvent can be reduced in reverse. The present invention is not limited to this embodiment; however as a result of the processing with an agent containing the above-described ions, stability of the structural member can be improved. Typically, by processing the Prussian blue-type complex nanoparticles in a structural member precursor with a chemical containing cations and/or anions, the anions are adsorbed in a case in which a surface of the nanoparticle charges positively, and the cations are adsorbed in a case in which a surface of the nanoparticle charges negatively whereby a charge on the nanoparticle surface is eliminated and stability can be given thereto.

The ions in the above-described agent (chemical) to be used are cations and/or anions of metal or metal complex. In a case in which the nanoparticle surface is covered with metal cyano complex ions, it is preferable for the agent to contain cations that adsorb to the metal cyano complex ions. Specifically, an ionized body of the metal atom $M_B$ that is a component of the Prussian blue-type metal complex nanoparticles is preferred; and iron ion, nickel ion, and cobalt ion are more preferred. In order that a cation is dispersed stably in a liquid, an anion serving as a counter ion is generally needed. In this case, the anion is not particularly limited as long as the anion does not counteract dispersibility of the cation; and chloride ion, nitrate ion, sulfate ion may be used.

In a case in which the nanoparticle surface is covered with metal cations, it is preferable that anions that adsorb to this are dispersed or dissolved in the chemical. Specifically, it is preferred for the chemical to contain metal cyano complex ions contained in $M_A$ that is a component of the Prussian blue-type metal complex nanoparticles. Further, hexacyano iron ion, hexacyano chromium ion, and hexacyano cobalt ion are more preferred. In this case, in order that an anion is dispersed stably in a liquid, a cation serving as a counter ion is generally needed. In this case, the cation is not particularly limited as long as the cation does not counteract dispersibility of the anion; and sodium ion, ammonium ion, potassium ion, lithium ion, rubidium ion, cesium ion and the like may be used.

In the present embodiment, a method of conducting a processing with a specific agent (a chemical or the like) is not particularly limited, as long as the specific agent contacts a structural member precursor of the Prussian blue-type metal complex nanoparticles. Examples of the method of conducting a processing with a specific agent include an embodiment in which a solution containing the above-described ions is prepared as the specific agent, and then the precursor is immersed in the solution. In this case, the immersing time is no object; however specifically the time is preferably less than 3 minutes.

(3-4) A Method of Stabilizing by Heating

In the present embodiment, the Prussian blue-type metal complex nanoparticles are heated at a specific temperature. The timing of heating is not particularly limited; and the timing may be either one of before, during or after the above-described nanoparticles are provided on a substrate. Especially, it is preferred to conduct a heat processing either one of during or after the above-described nanoparticles are provided on a substrate. In the case of conducting a heat processing during the above-described nanoparticles are provided on a substrate, it is desirable to heat the substrate in advance. As described above, since the Prussian blue-type metal complex is decomposed at 300° C. or more, sinter at a higher temperature than 300° C. is difficult. On the other hand, stabilization can be realized by heating at a lower temperature than 300° C. In this case, it is preferable that the whole surface thereof is not covered with hexacyano metal complex anions. It is preferable that approximately from ⅓ to ¾ of the whole surface thereof is covered with them. The temperature is preferably from 70° C. to 150° C., and more preferably from 80° C. to 120° C. The heating time is in a range of preferably from 1 minute to 2 hours, and especially from 5 minutes to 30 minutes. However, this method is not limited to these conditions.

The structural member of Prussian blue-type metal complex nanoparticles prepared as described above is provided on at least one side of a substrate whereby a structural member-provided board can be produced. Further, for example, an electrochromic device equipped with the structural member-provided board can be manufactured. This device is able to reversibly change the hue in accordance with an applied voltage. Especially, the electrochromic device of the present invention operates color change at a low voltage, and after color change, the hue is maintained even after the termination of the applied voltage. Using these characteristics, displays or the like having extremely high energy efficiency can be manufactured. The device configuration of an electrochromic device or the like may be referred to, for example, paragraphs [0045] to [0051] of Japanese Patent Application No. 2006-355513, and paragraphs [0018] to [0028] and [0100] of WO 2007/020945 pamphlet.

FIG. 1($a$) is a section view showing schematically an example of the structural element produced after the above-described processes (1) to (3). 1 represents a thin film of the Prussian blue-type metal complex nanoparticles stabilized in water. 2 represent an electrically conductive substrate (board). 10 represent a produced structural element.

The structural element of Prussian blue-type metal complex nanoparticles according to the present invention has extremely high stability. As a result, particularly use of the structural element in water has become possible. Accordingly, the structural element can be also applied to an intended purpose which necessitates an underwater usage such as a sensor use. Further, the structural element is also applicable to an electric device that actualizes the control by an electrical stimulus as a result of increase in adhesion with a substrate. Further, because production of a multilayer film, a composite membrane, or the like among other materials, or different kinds of nanoparticle materials becomes easy, production of devices for a wide range of intended purposes becomes easy. Specifically, the structural element is applicable to a broad range of applications such as a memory device, a dimmer (Photo Chromic Device), a display device, a primary battery, a secondary battery, a variable resistive element, and a sensor.

The multilayer film obtained by the present invention can be used in a wide range of intended purposes. FIG. 1($b$) is a sectional view showing schematically the structural element (device) 20 as an example thereof. 1 represents a thin film (a first thin film) containing a Prussian blue-type metal complex stabilized in water. 3 represent a thin film (a second thin film) containing a Prussian blue-type metal complex. 2 and 4 each represent an electrically conductive substrate (board). For example, in a case in which the multilayer film is used as an electrochromic device, at least one of the electrically conductive substrates is transparentized and two kinds of thin membranes displaying different colors from each other are multi-layered whereby a mixed color thereof can be obtained. For example, by using a multilayer film composed of a blue thin film and a yellow thin film, an electrochromic device displaying a green color which is a mixed color thereof can be produced. Further, by directly holding a multilayer film composed of a blue thin film and a yellow thin film directly between electrodes, an electrochromic device free from an electrolytic solution can be produced. By the same structure as described above, a rectifying device exhibiting resistance that is different in the direction of electric current, a photo responsive device that has different electrical characteristics according to conditions in light irradiation, or the like device can be also produced. Further, by an applied voltage, the control of multi-step colors can be realized. Further, by making materials that have different oxidation-reduction potential into a multilayered film, it also becomes possible to produce electrochemical devices such as a battery. In the present invention, the number of layers in the thin film containing a Prussian blue-type metal complex is not particularly limited; and the number of the layers may be determined appropriately in accordance with a purpose. However, given that the multilayer is made into the above-described electrochromic device, rectifying device, photo responsive device, or the like, from 2 to 6 layers are preferable, and from 2 to 4 layers are more preferable.

For example, in the device composed of two-layered PB-type complex layer, when a rectifying function, a photo responsive function, or a battery function is aimed, it is preferable that two kinds of PB-type complex to be used have different Fermi energy. Specifically, a combination of two kinds in the group consisting of Prussian blue, nickel Prussian blue-type metal complex (Ni—PBA), cobalt Prussian blue-type metal complex (Co—PBA), and copper Prussian blue-type metal complex (Cu—PBA) is preferred. Especially, a combination of Prussian blue and Ni—PBA is preferable. In the case of developing an electrochromic function, it is preferable that both the two kinds of PB-type complex have an electrochemical activity. A combination of two kinds in the group consisting of Prussian blue, Ni—PBA, Co—PBA, and Cu—PBA is preferred. Especially, a combination of Prussian blue and Ni—PBA is more preferable.

A specific method of forming the above-described laminated film of a Prussian blue-type metal complex thin film is not particularly limited. However, it is preferable that after performing the above-described processes (1) to (3) in a preferable embodiment of the present invention to form a first layer, the processes (1) and (2) are repeated on the surface of a thin film of the first layer, thereby providing a second layer thereon. In this time, when a third layer is further provided, the second layer is subjected to a stabilization-in-water processing according to the process (3) and then the third layer can be provided thereon. Thus, according to the present invention, a thin film can be formed by coating an aqueous dispersion element containing water-dispersible nanoparticles of a Prussian blue-type metal complex, and then the thin film may be arbitrarily subjected to a stabilization-in-water processing; and further it is possible to produce a desired laminated film of the Prussian blue-type metal complex nanoparticles with extremely good efficiency and good quality in such a manner that even though a similar aqueous dispersion element is further coated on the resultant thin film, the two are not mixed, or the previously coated layer does not flow out.

EXAMPLE

The present invention will be described in more detail based on examples given below, but the invention is not construed to be limited by these.

Preparation Example 1

(Preparation 1 of Water-Dispersible Prussian Blue Nanoparticles)

30 ml of an aqueous solution containing 16.2 g of iron nitrate nonahydrate dissolved in water was mixed with an aqueous solution containing 14.5 g of sodium ferrocyanide decahydrate dissolved in 60 ml of water, and the mixture was stirred for 5 minutes. The thus-precipitated blue Prussian blue (PB) deposit was separated by centrifugation. This deposit was washed with water three times and subsequently with methanol once, and then dried under reduced pressure. The yield was 11.0 g and the yield constant was 97.4% in terms of $Fe_4[Fe(CN)_6]_3 \cdot 15H_2O$.

Figure 2:
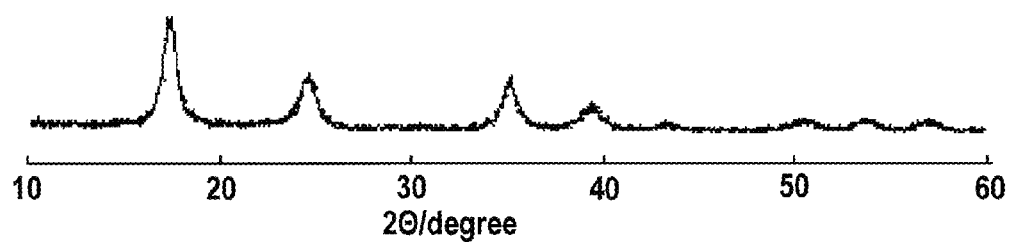
FIG. 2 is an X-ray diffraction chart of the Prussian blue complex obtained in Preparation Example 1.
Figure 3:
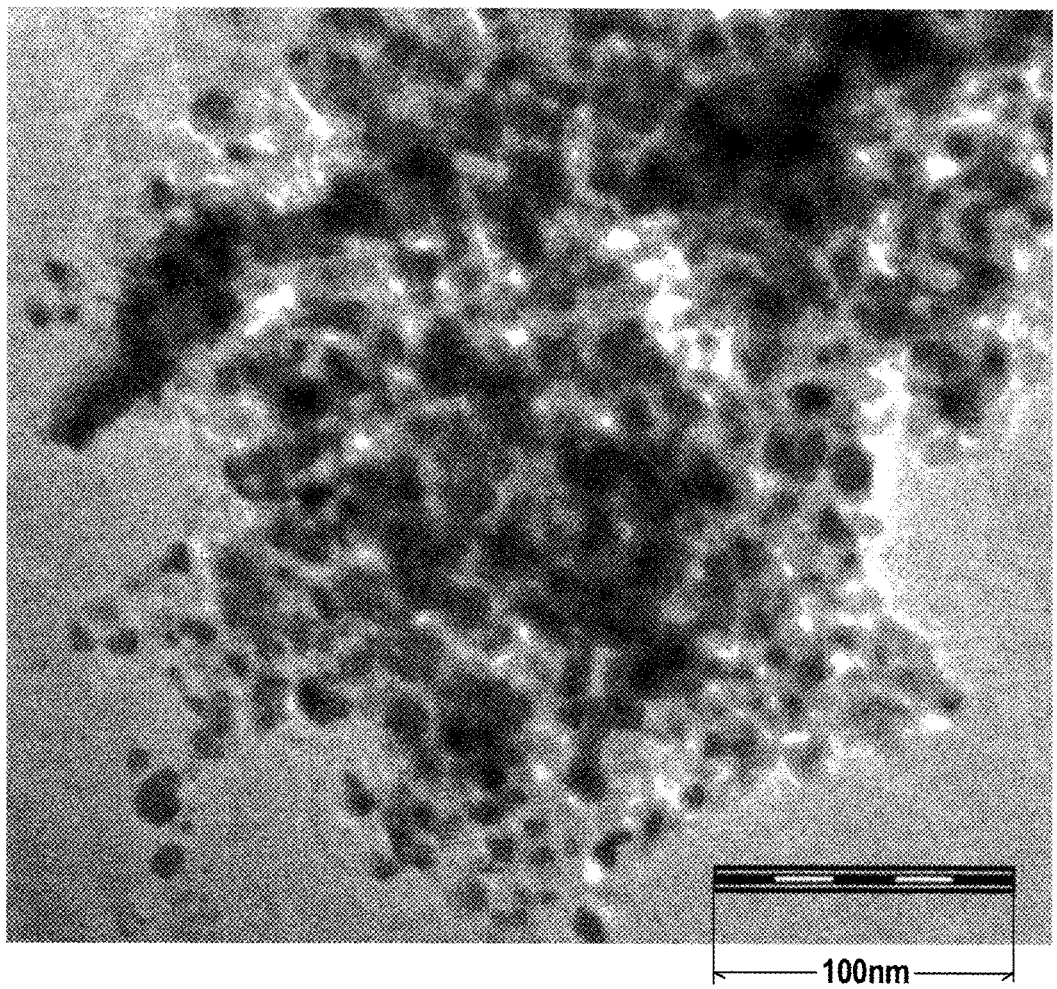
FIG. 3 is a photograph that is a substitute figure and that shows a transmission-type electron microscopic image of the Prussian blue nanoparticles obtained in Preparation Example 1.

The result of the produced Prussian blue complex (deposit) obtained by analysis with a powder X-ray diffractometer is shown in FIG. 2. This coincided with the data (not shown) of Prussian blue ($Fe_4[Fe(CN)_6]_3$) retrieved from the database of standard samples. In the FT-IR measurement, a peak originated from Fe—CN stretching vibration around 2080 cm$^{-1}$ was seen (not shown), which identified this solid material to be Prussian blue. As a result of measurement with a transmission-type electronic microscope, this Prussian blue was an aggregate of from 10 to 20 nm sized nanoparticles as shown in FIG. 3.

Figure 4:
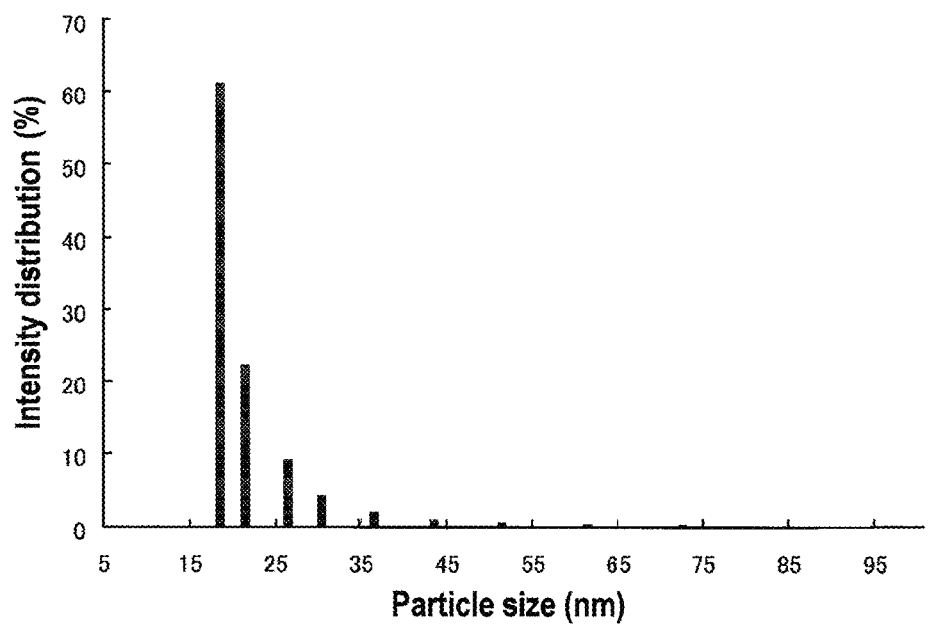
FIG. 4 is a graph showing a size distribution of the water-dispersible Prussian blue nanoparticles obtained in Preparation Example 1.

0.40 g of the above-described Prussian blue complex (aggregate) was suspended in 8 ml of water. To the resultant suspension, 180 mg of sodium ferrocyanide decahydrate was added. The suspension was changed to a blue transparent dispersion liquid by stirring. Thus, water-dispersible nanoparticles of Prussian blue (dispersion liquid 1) were obtained. The particle size of Prussian blue nanoparticles dispersed stably in the blue transparent dispersion liquid was measured by a dynamic light scattering method. As shown in FIG. 4, from the result of number-average size distribution, it was seen that Prussian blue nanoparticles were distributed in water in a range of approximately 21±6 nm.

(Preparation 2 of Water-Dispersible Prussian Blue Nanoparticles)

Preparation Example 2

In Preparation Example 1, 80 mg of sodium ferrocyanide decahydrate was added to a suspension liquid containing 0.40 g of Prussian blue complex (aggregate) suspended in 8 ml of water and the resultant suspension liquid was stirred. As a result, a blue transparent dispersion liquid was obtained similarly (dispersion liquid 2).

Preparation Example 3

(Preparation of Water-Dispersible Ni PBA Nanoparticles)

A solution containing 25.3 g of potassium ferricyanide dissolved in 80 ml of water and a solution containing 33.6 g of nickel nitrate hexahydrate dissolved in 20 ml of water were mixed at once and the mixture was stirred for 5 minutes. The precipitated deposit of yellow-brown nickel Prussian blue complex analog (Ni PBA) was recovered by separation centrifugation. This deposit was washed with water three times and subsequently with methanol once, and then dried under reduced pressure. The yield was 30.0 g and the yield constant was approximately 100% in terms of $Ni_3[Fe(CN)_6]_2 \cdot 10H_2O$.

Figure 5:
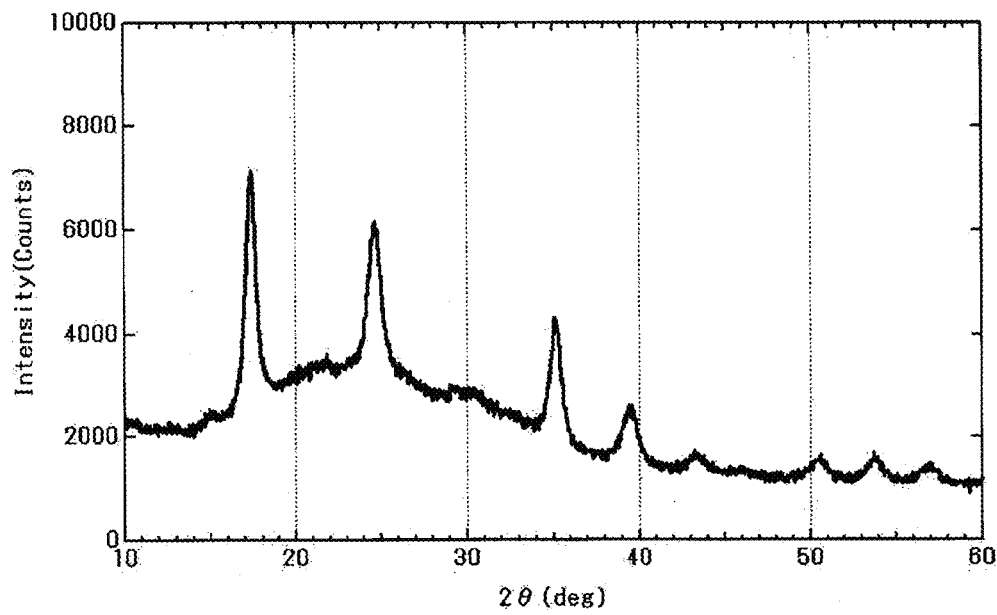
FIG. 5 is an X-ray diffraction chart of the nickel Prussian blue complex analog obtained in Preparation Example 3.

The result of the produced Nickel Prussian blue complex analog (deposit) obtained by analysis with a powder X-ray diffractometer is shown in FIG. 5. This coincided with the data (not shown) of nickel Prussian blue complex analog ($Ni_3[Fe(CN)_6]_2$) retrieved from the database of standard samples. Further, the size of these nanoparticles was estimated from a peak width of the powder X-ray diffraction pattern. As a result, they were an aggregate of 20 nm-sized nanoparticles.

3.1 g of sodium ferrocyanide decahydrate was dissolved in 200 ml of water. 10.0 g of the above-produced Nickel Prussian blue complex analog (aggregate) was added to this solution. The resultant suspension was stirred all night and all day, which resulted in change to yellow-brown dispersion liquid. Thus, a dispersion liquid of water-dispersible Nickel Prussian blue complex analog nanoparticles was obtained.

Figure 6:
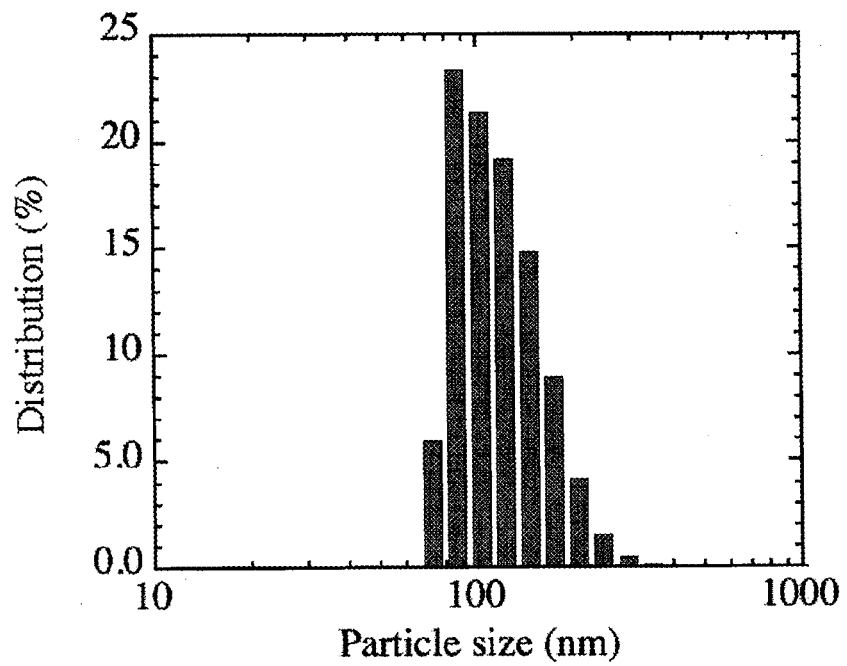
FIG. 6 is a graph showing a size distribution of the water-dispersible nickel Prussian blue complex analog obtained in Preparation Example 3.

The particle size of nanoparticles of Nickel Prussian blue analog dispersed stably in the yellow-brown dispersion liquid was measured by a dynamic light scattering method. As shown in FIG. 6, it was seen that Prussian blue nanoparticles were distributed in water in such a manner that the maximum distribution diameter was approximately 80 nm.

In the prepared Ni PBA water dispersion liquid (yellow-brown liquid), the water solvent was distilled away under reduced pressure. Thereby, a powder of Nickel Prussian blue complex analog nanoparticles was obtained almost quantitatively as an aggregate solid. The obtained powder was changed to a seal yellow-brown transparent dispersion liquid by re-dispersion to water (dispersion liquid 3).

Preparation Example 4

(Preparation of Water-Dispersible Cu PBA Nanoparticles)

A solution containing 1.69 g of potassium ferricyanide trihydrate dissolved in 15 ml of water and a solution containing 1.36 g of copper chloride dihydrate dissolved in 15 ml of water were mixed at once and the mixture was stirred for 5 minutes. The precipitated deposit of red copper Prussian blue complex analog (Co—PBA) was recovered by separation centrifugation. This deposit was washed with water three times. To the obtained deposit, a solution of 0.33 g of potassium ferricyanide trihydrate dissolved in 20 ml of water was added. The resultant suspension was stirred all night and all day, which resulted in change to a red dispersion liquid. Thus, a dispersion liquid of water-dispersible copper Prussian blue complex analog nanoparticles was obtained.

Processing Example 1

(Spin-Coat Film Production of Water-Dispersible Prussian Blue Nanoparticles)

Using a dispersion liquid of Prussian blue-type metal complex nanoparticles prepared in Preparation Example 1 (dispersion liquid 1, concentration: 0.1 g/ml), a nanoparticle thin film (structural element precursor) (thin film i) was produced by a spin coat method on the ITO coat of an ITO-coated glass substrate (2.5 centimeters in length and width, and 1.1 mm thick). Specifically, the ITO substrate was placed on the spin coater. 0.2 ml of dispersion liquid 1 was dropped thereto. Rotation of 2000 rpm was carried out for 10 seconds. The resultant substrate was subjected to still standing in the atmosphere at about 25° C. for 120 minutes to remove a solvent by drying thereby producing a filmy structural element precursor composed of Prussian blue nanoparticles. The film thickness was measured using a stylus profilometer (Stylus Profilometer: α-STEP (trade name), manufactured by KLA-Tencor Corporation). As a result, the film thickness was about 200 nm. Further, in a case in which the dispersion liquid 2 prepared in Preparation Example 2 was used, a similar thin film (thin film ii) was also obtained.

Processing Example 2

(Film Production of Water-Dispersible Ni PBA Nanoparticles Using Spin-Coat)

Using a Ni PBA nanoparticle dispersion liquid prepared in Preparation Example 3 (dispersion liquid 3, concentration: 0.1 g/ml), a nanoparticle thin film (structural element precursor) (thin film iii) was produced by a spin coat method on the ITO coat of an ITO-coated glass substrate (2.5 centimeters in length and width, and 1.1 mm thick). Specifically, the ITO substrate was placed on the spin coater. 0.2 ml of dispersion liquid 1 was dropped thereto. Rotation of 2000 rpm was carried out for 10 seconds. The resultant substrate was subjected to still standing in the atmosphere at about 25° C. for 120 minutes to remove a solvent by drying thereby producing a filmy structural element precursor composed of Prussian blue nanoparticles. The film thickness was measured using a stylus profilometer (Stylus Profilometer: α-STEP (trade name), manufactured by KLA-Tencor Corporation). As a result, the film thickness was about 200 nm.

Processing Example 3

(Film production of Water-Dispersible Prussian Blue Nanoparticles Using Inkjet)

Using the above-described dispersion liquid, a microfabrication element was produced by means of an inkjet printer. Specifically, the Prussian blue nanoparticle dispersion liquid 1 prepared in Preparation Example 1 was diluted so as to become 0.01 g/ml. Using the resultant dispersion liquid, an inkjet injector (PULSE INJECTOR (trade name), manufactured by Cluster Technology Co., Ltd.) and WAVEBUILDER (trade name), a dot-like thin film (structural element precursor) (thin film iv) was produced on the ITO coat of an ITO-coated glass substrate (2.5 centimeters in length and width, and 1.1 mm thick). The circle-equivalent diameter of one dot was a degree of about 2 mm. Such dots were provided almost evenly over the glass substrate, leaving about 2 mm between dots.

Example 1

(Stabilization-In-Water by Means of Electrochemical Processing)

A thin film of Prussian blue nanoparticles was produced on an ITO substrate by using the dispersion liquid 1 according to the same processes as in Processing Example 1, and then dried in the atmosphere for 1 day, thereby obtaining thin film (structural element precursor) 1a. This thin film (structural element precursor) was subjected to an electrochemical processing by using a cyclic voltammetry. On this occasion, the processing was carried out under the following conditions:

A counter electrode and a reference electrode: platinum and a saturated Calomel electrode respectively; an electrolytic solution: 0.1 M $KPF_6$ acetonitrile solution; potential sweep: +0.8 V to −0.4V; number of sweep: 5 times; and scan rate: 20 mV/second. After that, the thin film was washed with acetonitrile and dried for 24 hours to obtain thin film (structural element) 1. The thin film 1 was immersed together with a substrate in distilled water for 5 minutes and subjected to still standing (test of stabilization-in-water). As a result, though peeling was seen partially around the outer edge of the substrate or the like, a major part of the thin film remained unchanged.

Example 2

(Stabilization-In-Water by Means of Electrochemical Processing)

A thin film of Prussian blue nanoparticles (structural element precursor) 2a and a thin film (structural element) 2 were obtained in the same manner as in Example 1, except that the number of potential sweep was changed to 25 times. The test of stabilization-in-water was conducted in the same manner as in Example 1. As a result, there was almost no structural element the portion of which was peeled, and the entire structural element remained unchanged.

Figure 7:
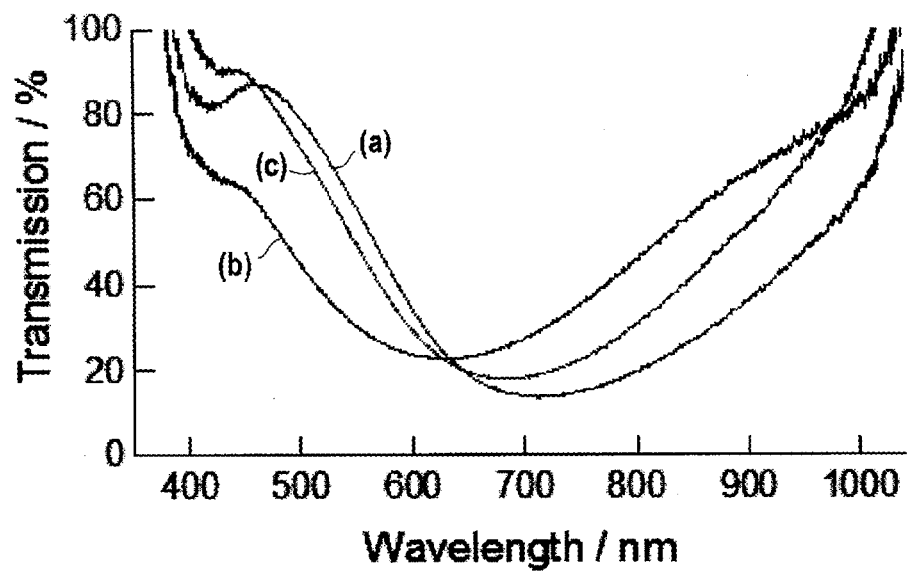
FIG. 7 is an absorption spectrum of the Prussian blue thin film obtained in Example 2.

Results of measurement of absorption spectrum with respect to the thin film (structural element precursor) 2a, the thin film 2 (before test of stabilization-in-water) and the thin film 2 (after test of stabilization-in-water) were as shown in FIG. 7. In the figure, spectra (a), (b) and (c) were shown in the same order as the above-described thin film samples. From these results, it is seen that a definite change of spectrum as well as stabilization-in-water is achieved by subjecting the thin film to an electrochemical processing, which makes it possible to adjust and control the color tone.

Example 3

A thin film 1b was produced in the same manner as the thin film (structural element precursor) 1a in Example 1 except that the dispersion liquid 2 was used. The thin film b was subjected to an electrochemical processing by using a square-wave voltammetry method. Thus, a thin film 1c was obtained. The potential was set so as to be −0.4 V for 20 seconds and subsequently +0.8 V for 20 seconds using a saturated Calomel electrode as the standard electrode. On this occasion, a counter electrode, a reference electrode and an electrolytic solution are the same as those in Example 1. The test of stabilization-in-water was conducted in the same manner as in Example 1. As a result, there was almost no structural element the portion of which was peeled, and the entire structural element remained unchanged.

Example 4

(Stabilization-In-Water by Means of Coating on a Substrate the Surface of Which Has Been Provided with Metals Having High Work Function)

A metal coated substrate (2.5 centimeters in length and width) composed of gold (film thickness: 100 nm)/chromium (film thickness: 5 nm)/glass (film thickness: 1.5 mm) was prepared by vacuum deposition. The gold surface was subjected to a hydrophilization treatment (300 W, 180 sec) using PLASMAASHER PR 500 (trade name, manufactured by Yamato Scientific Co., Ltd.). After that, the dispersion liquid 1 (0.1 g/ml) was coated on the gold surface of the above-described substrate by a spin coat method under the condition of 20 seconds at a rotation speed of 1500 rpm. Thereafter, the coating was dried in the atmosphere for 24 hours whereby a solvent was eliminated. Thus, thin film (structural element) 3 was obtained. The film thickness of the thin film was 185 nm.

Figure 8:
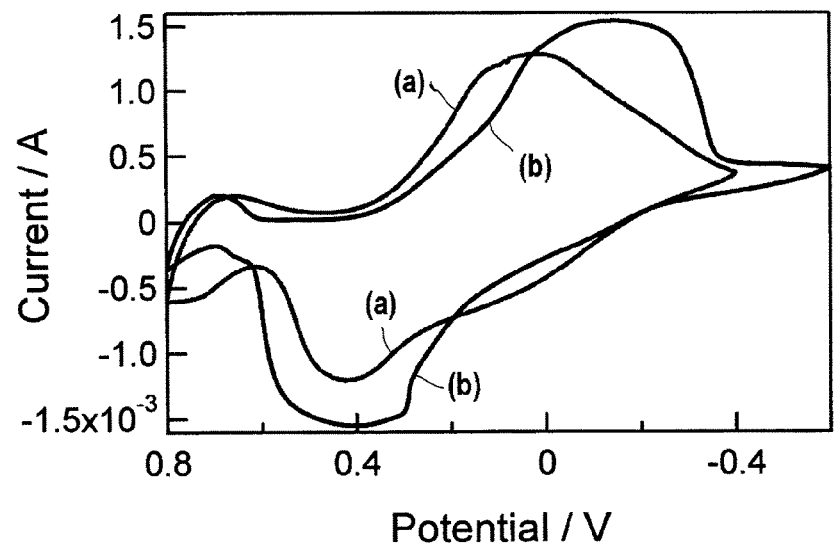
FIG. 8 is a Cyclic Voltammogram of the Prussian blue thin film obtained in Example 4.

The test of stabilization-in-water was conducted in the same manner as in Example 1 with respect to the above-described thin film 3. As a result, peeling or the like was not seen in the thin film of Prussian blue nanoparticles, so that the thin film remained unchanged. Electrochemical responsiveness of the thin film 3 was confirmed in a 0:1 M $KPF_6$-acetonitrile solution by using a cyclic voltammetry method (counter electrode: platinum; reference electrode: saturated Calomel electrode; scan rate: 20 m V/sec; potential range: 5 round reciprocating sweep of +0.8V to −0.4V). The results are shown by a cyclic voltammogram (a) in FIG. 8. On this occasion, the thin film structural element exhibited a reversible color change from a solid color (transparence) to a yellowish green color before and after the potential sweep.

A specimen of the above-described thin film (structural element) 3 was used to conduct a test of electrochemical responsiveness thereof in a 0.1 M potassium hydrogen phthalate aqueous solution by using a cyclic voltammetry method (counter electrode: platinum; reference electrode: saturated Calomel electrode; scan rate: 20 m V/sec; potential range: 5 round reciprocating sweep of +0.8V to −0.6V). As a result, an electrochemical responsiveness was exhibited similarly in an acetonitrile electrolytic solution as shown by the cyclic voltammogram (b) in FIG. 8. On this occasion, the thin film structural element exhibited a reversible color change from a solid color (transparence) to a bluish green color before and after the potential sweep.

In this way, the color exhibited by color change was different from the color in the case of the acetonitrile electrolytic solution.

As is seen from this result, the structural element of Prussian blue-type metal complex nanoparticles according to the present invention has stability in water, so that a polar solvent such as water can be used as a medium for an electrolytic solution. Accordingly, it is seen that the scope of its application can be widely expanded. Further, it s seen that the color tone can be adjusted or controlled by changing the kind of an electrolytic solution.

Example 5

(Stabilization-in-Water by Means of Coating on a Substrate the Surface of which has Been Provided with Metals Having High Work Function)

A metal coated substrate composed of gold (film thickness: 100 nm)/chromium (film thickness: 5 nm)/glass (film thickness: 1.5 mm) was prepared by vacuum deposition. After that, the dispersion liquid 1 (0.1 g/ml) was coated on the copper surface of the above-described substrate by a spin coat method under the condition of 20 seconds at a rotation speed of 1500 rpm. Thereafter, the coating was dried in the atmosphere for 24 hours whereby a solvent was eliminated. Thus, thin film (structural element) 4 was obtained. The film thickness of the thin film was 200 nm. The test of stabilization-in-water was conducted in the same manner as in Example 1 with respect to the above-described thin film 4. As a result, peeling or the like was not seen in the thin film of Prussian blue nanoparticles (structural element), so that the thin film remained unchanged.

Example 6

(Stabilization-In-Water by Means of Chemical (Treatment Agent))

Similarly to Processing Example 1 using the dispersion liquid 1, Prussian blue thin film (structural element precursor) 5a was prepared. A part of the thin film 5a was subjected to still standing in a 0.1 M iron chloride aqueous solution for 5 seconds. A part of the part thereof was further continued to be subjected to still standing for 5 seconds (still standing for 10 seconds in total). The part subjected to still standing in chemical for 5 seconds was designated as thin film (structural element) 5-1. The part subjected to still standing in chemical for 10 seconds was designated as thin film (structural element) 5-2. Immediately after the end of the still standing in chemical, the test of stabilization-in-water was conducted in the same manner as in Example 1 with respect to the above-described thin films 5-1 and 5-2. The peeling of the thin film structural element was not seen.

Figure 9:
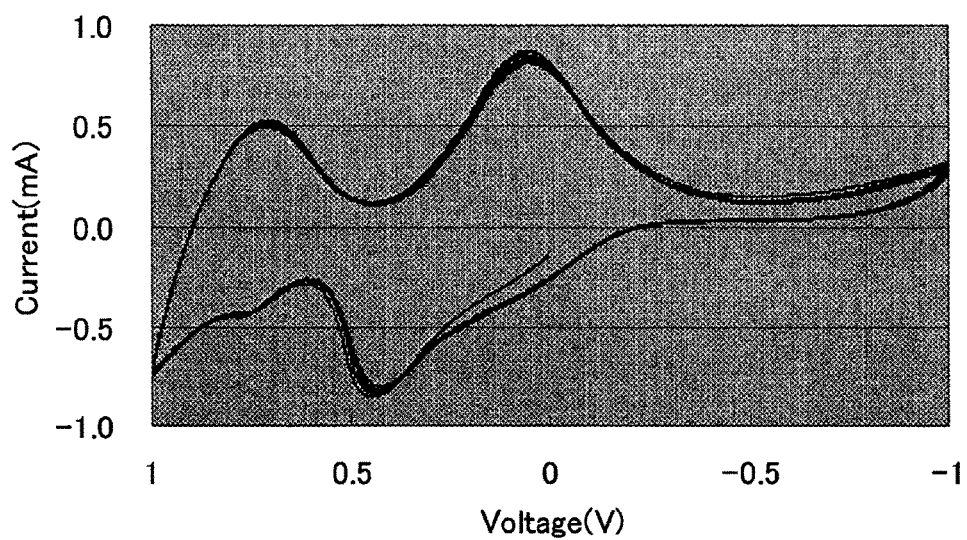
FIG. 9 is a Cyclic Voltammogram of the Prussian blue thin film obtained in Example 6.
Figure 10:
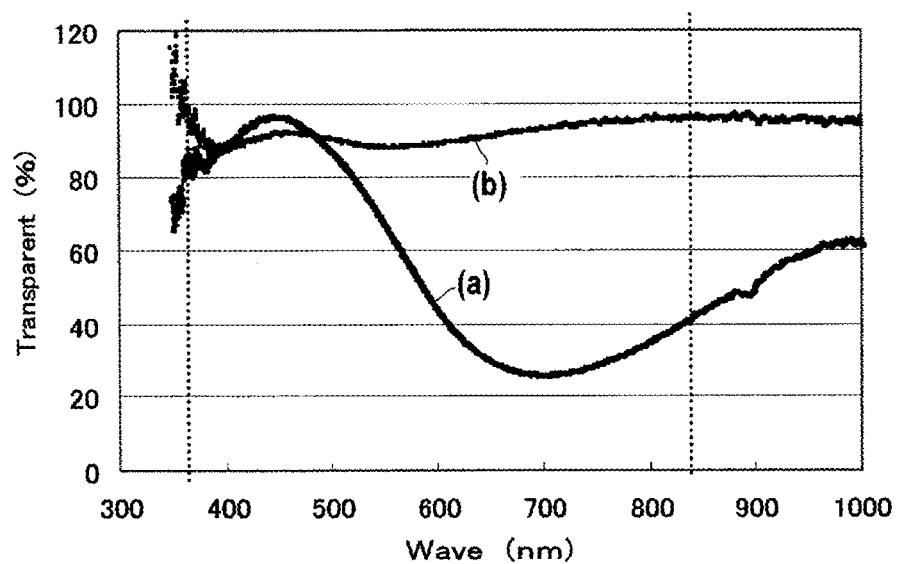
FIG. 10 is an absorption spectrum of the Prussian blue thin film obtained in Example 6 during electrochemical measurement thereof.

The thin film 5-1 was placed in a 0.1M $KPF_6$-acetonitrile solution to conduct an electrochemical measurement in accordance with a cyclic voltammetry method (counter electrode: platinum; reference electrode: saturated Calomel electrode; scan rate: 20 m V/sec; potential range: 5 round reciprocating sweep of 1.0V to −1.0V). As a result, the same electrochemical responsiveness as that before the chemical liquid treatment was seen (refer to FIG. 9). Further, as shown in FIG. 10, a reversible color change of blue (a)—transparence (b) was exhibited.

Example 7

(Stabilization-In-Water by Means of Chemical (Treatment Agent))

Similarly to Processing Example 2 using the dispersion liquid 3, NiPBA thin film (structural element precursor) 6a was prepared. A part of the thin film 6a was subjected to still standing in a 0.1 M nickel nitrate aqueous solution for 5 seconds. A part of the part thereof was further continued to be subjected to still standing for 5 seconds (still standing for 10 seconds in total). The part subjected to still standing in chemical for 5 seconds was designated as thin film (structural element) 6-1. The part subjected to still standing in chemical for 10 seconds was designated as thin film (structural element) 6-2. Immediately after the end of the still standing in chemical, the test of stabilization-in-water was conducted in the same manner as in Example 1 with respect to the above-described thin films 6-1 and 6-2. The peeling of the thin film structural element was not seen.

Figure 11:
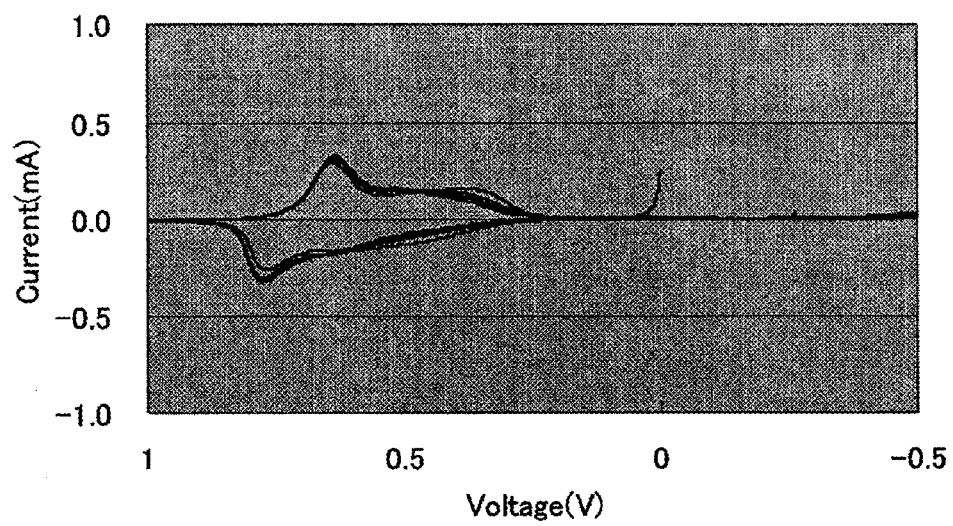
FIG. 11 is a Cyclic Voltammogram of the nickel Prussian blue complex analog thin film obtained in Example 7.
Figure 12:
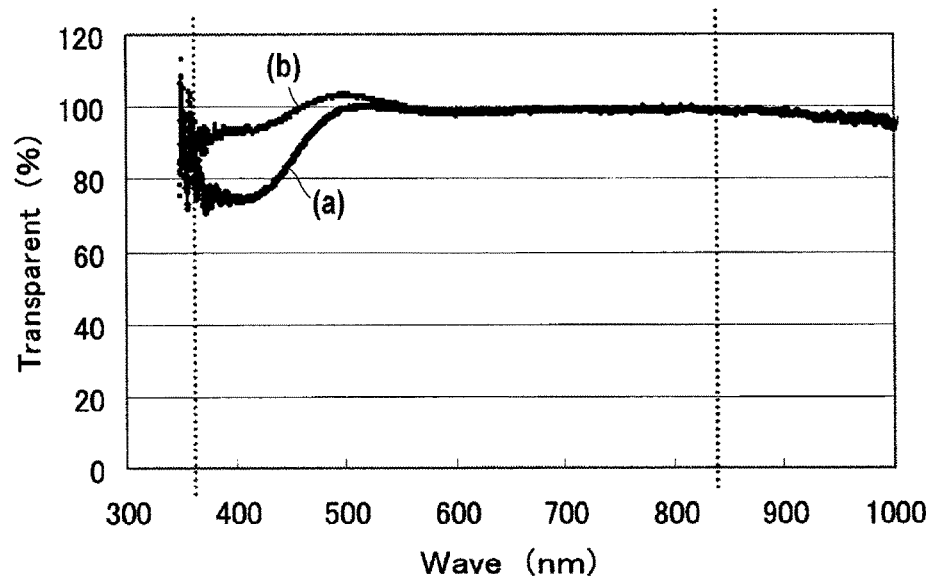
FIG. 12 is a transmittance of the nickel Prussian blue complex analog thin film obtained by Example 7 during electrochemical measurement thereof.

The thin film 6-1 was placed in a 0.1M KPF$_6$-acetonitrile solution to conduct an electrochemical measurement in accordance with a cyclic voltammetry method (counter electrode: platinum; reference electrode: saturated Calomel electrode; scan rate: 20 m V/sec; potential range: 5 round reciprocating sweep of +1.0V to −0.5V). As a result, the same electrochemical responsiveness as that before the chemical liquid treatment was seen (refer to FIG. 11). Further, as shown in FIG. 12, a reversible color change of yellow (a)—transparence (b) was exhibited.

Example 8

(Stabilization in Water by Means of Chemical (Treatment Agent))

Similarly to Processing Example 2 using the dispersion liquid 3, NiPBA nanoparticle thin film (structural element precursor) 7a was prepared. A part of the thin film 7a was subjected to still standing in a 0.1 M iron chloride aqueous solution for 5 seconds. A part of the part thereof was further continued to be subjected to still standing for 5 seconds (still standing for 10 seconds in total). The part subjected to still standing in chemical for 5 seconds was designated as thin film (structural element) 7-1. The part subjected to still standing in chemical for 10 seconds was designated as thin film (structural element) 7-2. In each thin film, a color change of from yellow to green immediately after immersion thereof to the chemical was seen. This is assumed that in addition to yellow originated from NiPBA, by the addition of iron ions which are a raw material of Prussian blue, a part of the element became to have the same structure as the Prussian blue, which results in giving a blue color tone. In this way, a color tone can be adjusted or controlled by a chemical liquid treatment. Immediately after the end of the still standing in chemical, the test of stabilization-in-water was conducted in the same manner as in Example 1 with respect to the above-described thin films 7-1 and 7-2. The peeling of the thin film structural element was not seen.

Figure 13:
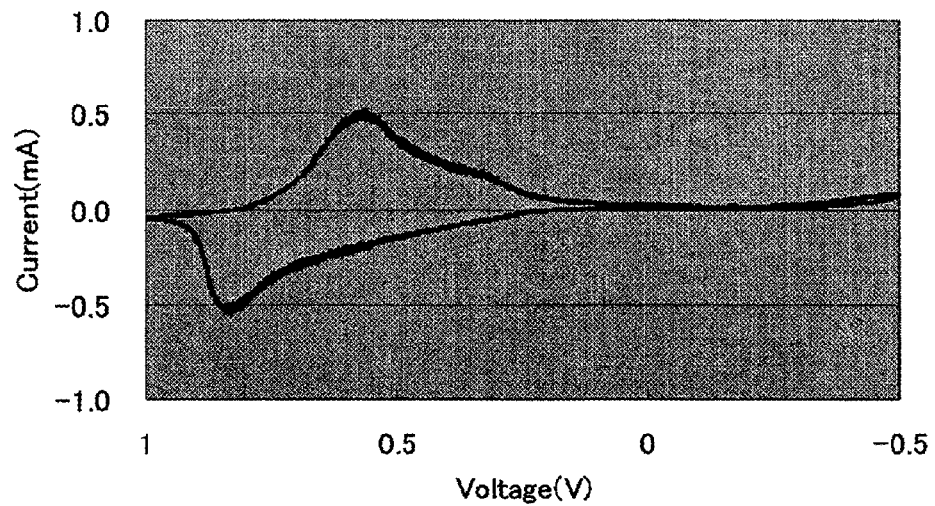
FIG. 13 is a Cyclic Voltammogram of the thin film of the nickel Prussian blue complex analog (Prussian blue shell structure) obtained in Example 8.
Figures 1, 14:
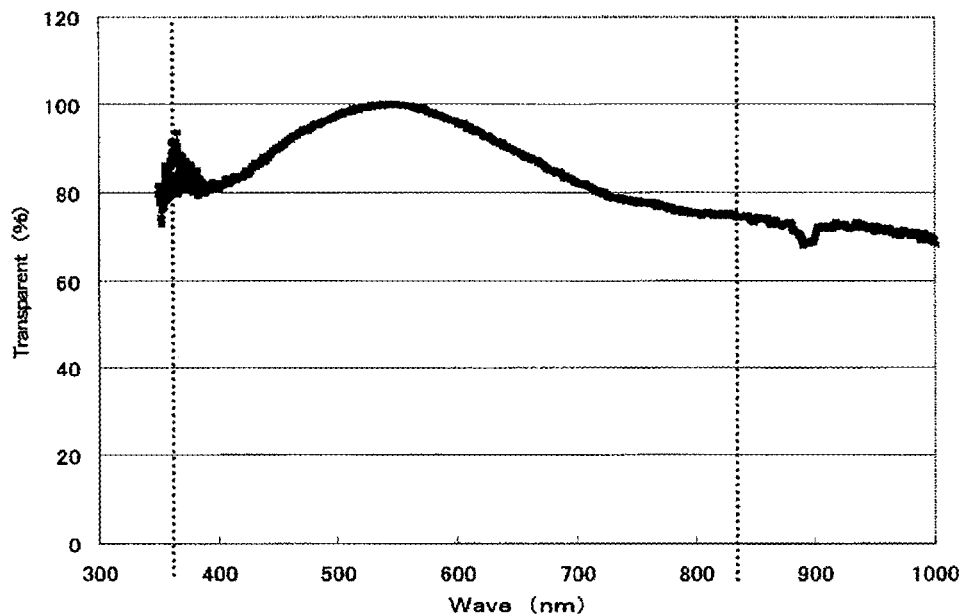
Figures 2, 14:
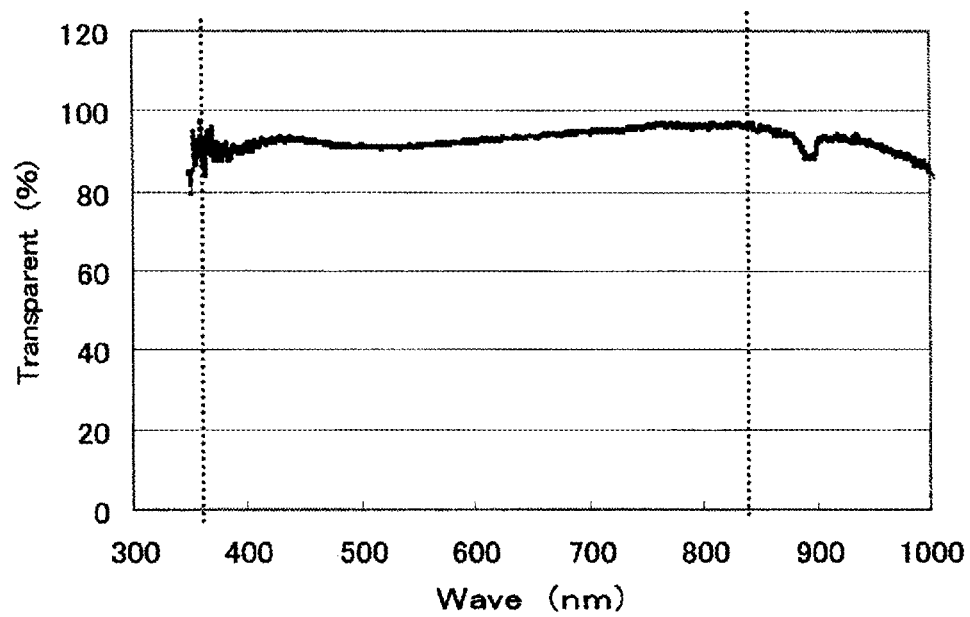

An electrochemical measurement of the thin film 7-1 was conducted in a 0.1M KPF$_6$-acetonitrile solution according to a cyclic voltammetry (counter electrode: platinum; reference electrode: saturated Calomel electrode; scan rate: 20 m V/sec; potential range: 5 round reciprocating sweep of 1.0V to −0.5V). As a result, the same electrochemical responsiveness as that before the chemical liquid treatment was seen as shown in FIG. 13. Further, on this occasion, a reversible color change of green (FIG. 14-1)—transparence (FIG. 14-2) was exhibited.

Example 9

(Stabilization in Water by Means of Chemical (Treatment Agent))

Thin film structural elements 8-1 to 8-22 were produced in the same manner as Example 7, except that the kind of nanoparticles and the kind and the concentration of the chemical were changed as shown in the following Table 1. The test of stabilization-in-water and the electrochemical responsiveness test of the obtained thin film structural element samples were conducted in the same manner as in Example 7. Each sample showed excellent stabilization-in-water and the electrochemical responsiveness.

TABLE 1

| Sample No. | Nanoparticle | Dispensing agent (Treating agent) | Dispensing agent concentration (mol/L) | Immersing duration (sec.) |
|---|---|---|---|---|
| 8-1 | PB | Fe(NO$_3$)$_3$ | 0.1 | 1 |
| 8-2 | PB | Fe(NO$_3$)$_3$ | 0.1 | 5 |
| 8-3 | PB | Fe(NO$_3$)$_3$ | 0.5 | 60 |
| 8-4 | PB | Fe(NO$_3$)$_3$ | 0.1 | 30 |
| 8-5 | PB | Fe(NO$_3$)$_3$ | 0.1 | 10 |
| 8-6 | PB | FeCl$_2$ | 0.5 | 5 |
| 8-7 | PB | Fe(NO$_3$)$_3$ | 0.1 | 60 |
| 8-8 | PB | FeCl$_2$ | 0.5 | 30 |
| 8-9 | PB | FeCl$_2$ | 0.5 | 10 |
| 8-10 | PB | FeCl$_2$ | 0.1 | 5 |
| 8-11 | PB | FeCl$_2$ | 0.5 | 60 |
| 8-12 | PB | FeCl$_2$ | 0.1 | 30 |
| 8-13 | PB | FeCl$_2$ | 0.1 | 10 |
| 8-14 | PB | Ni(NO$_3$)$_2$ | 0.5 | 30 |
| 8-15 | PB | FeCl$_2$ | 0.1 | 60 |
| 8-16 | NiPBA | Ni(NO$_3$)$_2$ | 0.5 | 5 |
| 8-17 | PB | Ni(NO$_3$)$_2$ | 0.5 | 60 |
| 8-18 | NiPBA | FeCl$_2$ | 0.1 | 5 |
| 8-19 | NiPBA | Ni(NO$_3$)$_2$ | 0.5 | 10 |
| 8-20 | NiPBA | Ni(NO$_3$)$_2$ | 0.1 | 10 |
| 8-21 | NiPBA | FeCl$_2$ | 0.1 | 10 |
| 8-22 | CuPBA | FeCl$_2$ | 0.1 | 5 |

Example 10

(Stabilization-In-Water by Means of Chemical Liquid Treatment of a Structure Produced by Inkjet Ejection)

A dot-like thin film of Prussian blue nanoparticles (structural element precursor) 9a produced by inkjet ejection in Processing Example 3 was immersed in a 0.1 M iron nitrate aqueous solution for 10 seconds to obtain a dot-like thin film (structural element) 9. Immediately after the end of the above-described immersion, the thin film 9 was immersed in water. Peeling or the like of the thin film was not seen, and the thin film remained unchanged. In contrast, with respect to the portion that has not yet been immersed in the iron nitrate aqueous solution, the structural element was peeled and dispersed immediately after immersion in water.

A measurement of a cyclic voltammetry of the above-described thin film (structural element) 9 was conducted in a 0.1 M potassium hydrogen phthalate aqueous solution (counter electrode: platinum; reference electrode: saturated Calomel electrode; scan rate: 20 m V/sec; potential range: 2 round reciprocating sweep of +0.8V to −0.8V). As a result, a reversible color change of blue color-transparence was seen.

Example 11

(Stabilization by Heating)

The thin film ii obtained in Processing Example 1 and having not yet been subjected to stabilization-in-water was heated in an oven at 100° C. for 10 minutes. Thereafter, this thin film was immersed together with a substrate in distilled water for 5 minutes and subjected to still standing (test of stabilization-in-water). As a result, though peeling was seen partially around the outer edge of the substrate or the like, a major part of the thin film remained unchanged. Further, the dispersion liquid 1 obtained in Preparation Example 1 was coated by a commercially available spray on an ITO substrate having been heated at 120° C. and having been maintained the temperature. The same stabilization-in-water effect as the above was seen.

Example 12

(Making of Multilayer Film by an Electrochemical Treatment)

Figure 15:
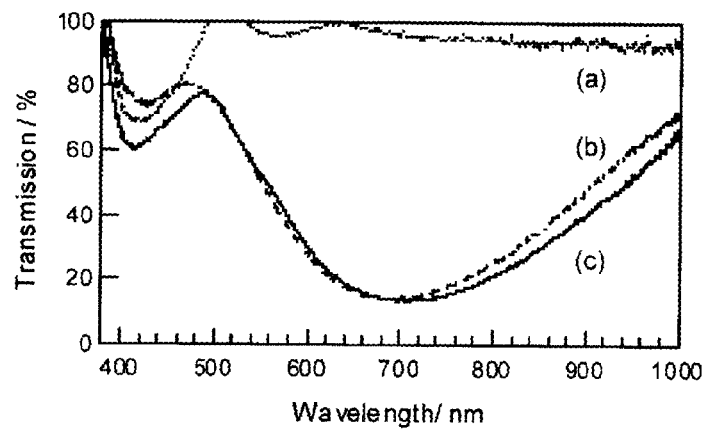
FIG. 15 is an optical transmittance spectrum of the multilayer film obtained in Example 12, in which (a) is a spectrum of NiPBA thin film, (b) is a spectrum of PB, (c) is a spectrum of the multilayer film in which the NiPBA thin film is provided on a PB thin film having been insolubilized by an electrochemical treatment.

On the top of the thin film 1 obtained in Example 1, a NiPBA thin film was provided using the dispersion liquid 3 by a spin coat method. Thus, multilayer 1 was obtained. Specifically, the thin film was placed on the spin coater. 0.2 ml of the dispersion liquid 3 was dropped thereto. Rotation of 2000 rpm was carried out for 10 seconds. The resultant thin film was subjected to still standing in the atmosphere at about 25° C. for 120 minutes to remove a medium by drying. Thus, the multilayer film 1 was obtained. FIG. 15 shows an optical transmittance spectrum of the above-described multilayer film 1 produced using an insoluble treatment by means of an electrochemical treatment. (a) spectrum of NiPBA thin film. (b) spectrum of PB. (c) spectrum of multilayer film in which a NiPBA thin film is provided on the PB thin film having been made insoluble by an electrochemical treatment.

Example 13

(Making of Multilayer Film by a Chemical Liquid Treatment)

Figure 16:
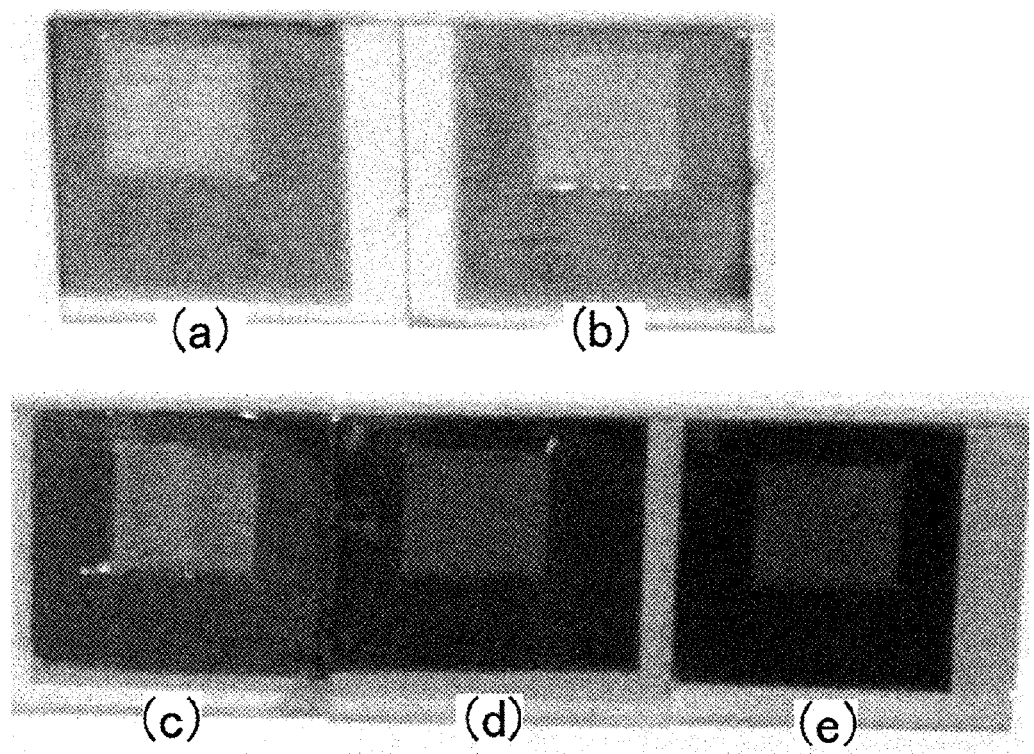
FIG. 16 is photographs of the multilayered thin film of the Prussian blue nanoparticles obtained in Example 13. Starting from the left of upper stage, those of Single Layer (a) prior to chemical liquid treatment, Single Layer (b) after chemical liquid treatment, Double Layer Laminated Film (c), a Triple Layer Laminated Film (d) and a Quadruple Layer Laminated Film (e) are shown.
Figure 17:
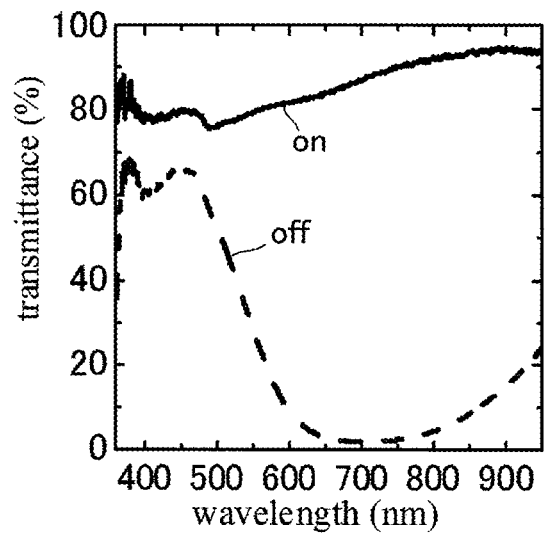
FIG. 17 shows a transmittance of the multilayered thin film of the Prussian blue nanoparticles obtained in Example 13, during electrochemical measurement thereof.

A film production of the Prussian blue nanoparticle thin film by a spin coat method in the same manner as in Example 5 and stabilization by a chemical liquid treatment were carried out sequentially to obtain a multilayer film. FIG. 16 shows photographs of appearance in which a sample after the first spin coat but before a chemical liquid treatment was designated as Single Layer (a) prior to chemical liquid treatment; a sample subjected to a chemical liquid treatment onto the sample was designated as Single Layer (b) after a chemical liquid treatment; a sample further subjected to the second spin coat and a chemical liquid treatment was designated as Double Layer Laminate Film (c); a sample subjected to the third spin coat and a chemical liquid treatment was designated as Triple Layer Laminate Film (d); and a sample subjected to the forth spin coat and chemical liquid treatment was designated as Quadruple Layer Laminate Film (e). In each of the (a) to the (e), a small square region located at the approximately upper portion of the center is a part which shows a color of the Prussian blue nanoparticle thin film. A large square region surround the small square region is a part in which a polyimide tape has been bonded to the surface of the Prussian blue nanoparticle thin film in order to define a reaction area at the time of electrochemical measurement described later. As shown in the figure, a darker film was obtained with the increasing number of a laminate. Further, an electrochemical measurement of the thus-obtained four-layered film was conducted. As a result, realization of electrochromic characteristics of coloration (absence of applied voltage [off]) and discolor (presence of applied voltage [on]) became possible as shown in FIG. 17.

Example 14

(Color Control of Multilayer Film Using Stabilization by a Chemical Liquid Treatment)

After a film production of the Prussian blue nanoparticle thin film displaying a blue color by a spin coat method and stabilization by a chemical liquid treatment in the same manner as in Example 6, a NiPBA nanoparticle thin film displaying a yellow color was provided on the top of the above-described thin film. By these steps, multilayer film 2 displaying a green color, namely a mixed color of the blue color and the yellow color was obtained. Specifically, after a film production of the Prussian blue nanoparticle thin film in the same manner as in Example 5 and stabilization by a chemical liquid treatment, the thin film was placed on the spin coater. 0.2 ml of the dispersion liquid 3 was dropped thereto. Rotation of 2000 rpm was carried out for 10 seconds. The resultant thin film was subjected to still standing in the atmosphere at about 25° C. for 120 minutes to remove a medium by drying. Thus, multilayer film 2 was obtained.

Figure 18:
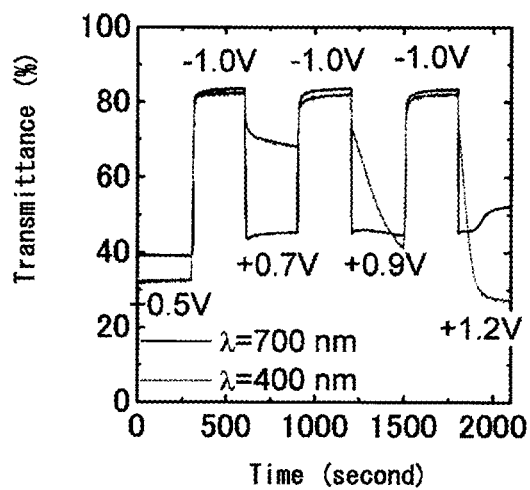
FIG. 18 shows transmittances of the laminated film obtained in Example 14, in which the orange color shows a transmittance of the multilayered film 2 at the wavelength of 400 nm, and the blue color shows a transmittance of the multilayered film 2 at the wavelength of 700 nm.

The multilayer film 2 was potentially controlled. As a result, a change of color was seen in accordance with the potential as shown in FIG. 18. In the FIG. 18, the pale-colored line indicates a transmittance of the multilayer film 2 at the wavelength of 400 nm, while the dark-colored line indicates a transmittance of the multilayer film 2 at the wavelength of 700 nm. For example, it is seen that when the potential is +0.7 V, the transmittance at the wavelength of 700 nm is low whereby the multilayer film 2 displays a blue color. When the potential is +0.9 V, the transmittance at the wavelength of 700 nm and the transmittance at the wavelength of 400 nm are approximately equal whereby the multilayer film 2 displays a green color. When the potential is +1.2 V, the transmittance at the wavelength of 400 nm is low whereby the multilayer film 2 displays a yellow-green color. As mentioned above, the multilayer obtained by the present invention makes it possible to control its oxidation-reduction potential by the applied potential, so that a variety of colors can be controlled.

Example 15

(Photoresist Patterning Using Insolubilization)

Figure 19:
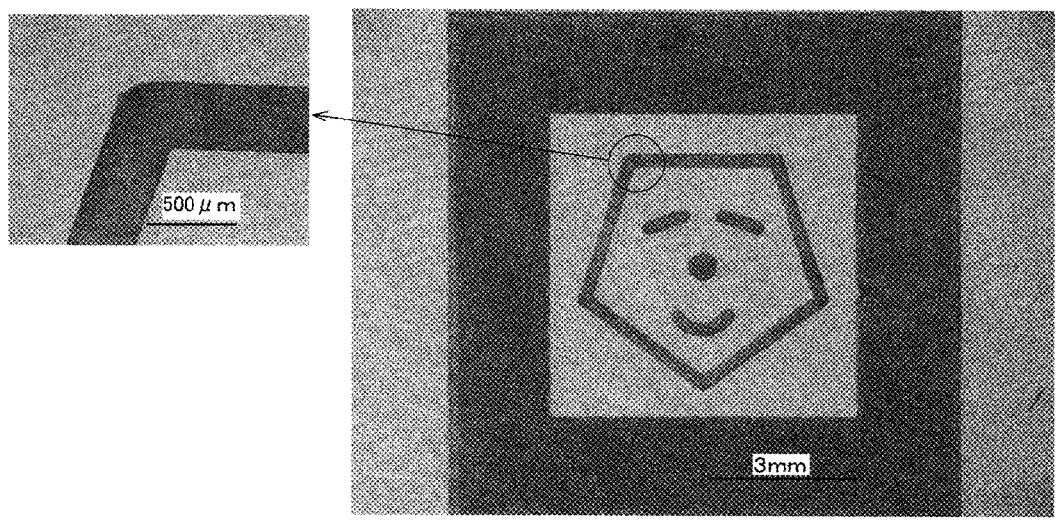
FIG. 19 is photographs of a pattern of the Prussian blue metal complex nanoparticles formed on an ITO substrate by photoresist patterning that is achieved using insolubilization, obtained in Example 15.

As an example of a pattern printing by a wet process, a pattern printing was carried out on an ITO substrate by a photolithography using an aqueous dispersion of Prussian blue metal complex nanoparticles. The used aqueous dispersion of nanoparticles is 0.1 g of a sample dispersed in 1 ml of water. A light-sensitive photoresist was coated on an ITO substrate, followed by a pattern transfer using an ultraviolet ray and development. Thereafter, a film production was carried out by a spin coat on the remaining photoresist pattern using the aqueous dispersion of Prussian blue metal complex nanoparticles. After still standing overnight, electrochemical oxidation-reduction was conducted more than once using a solvent to which the photoresist was hardly transferred. By this method, it was found that the portion of the nanoparticle film adhered to the ITO was insolubilized with respect to water or organic solvents, and at the same time, adhesiveness of the film to the ITO was enhanced. By scrapping off the photoresist film using an organic solvent in which the photoresist is easily dissolved, a patterned portion of the nanoparticle film adhered to the ITO remained. As shown in FIG. 19, a pattern of the Prussian blue metal complex nanoparticles (a figure representing a pentagonally-outlined person's face) was produced on the ITO substrate. This method makes it possible to prepare a detailed pattern of 1 mm or less.

Example 16

(Photoresist Patterning Using Insolubilization)

On the top of the patterned thin film of the stabilized Prussian blue metal complex nanoparticles prepared in Example 15, the Ni—PBA dispersion liquid obtained in Preparation Example 3 was coated by a spin coat method in the same manner as in Processing Example 2. By this method, a multilayer film composed of the Prussian blue nanoparticle thin film and the Ni—PBA nanoparticle thin film was obtained. As seen from the above, the shape of the thin films in the case of producing a multilayer film may be different from each other.

Example 17

(Production of Structural Element Having a Rectifying Action)

Figure 20:
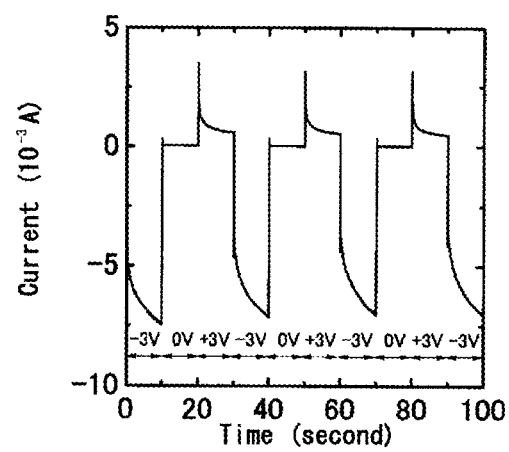
FIG. 20 is a graph showing current characteristics in the time when the voltages of −3 V, 0 V, and 3 V have been applied to the Prussian blue nanoparticle side of the laminated film obtained in Example 16 in a manner such that the voltage to be applied is switched at every 10 seconds.

A rectifying device is obtained by holding a multilayer film between electrodes. A multilayer film composed of the Prussian blue nanoparticle thin film and the Ni—PBA nanoparticle thin film provided on the ITO was obtained in the same manner as in Example 12. On this multilayer film, an ITO thin film was produced by a spattering method to obtain an intended structural element. Current characteristics in the time when the voltages of −3 V, 0 V and 3 V were switched at every 10 seconds so that the voltage is applied to the Prussian blue nanoparticle side of the obtained structural element is shown in FIG. 20. As shown in this figure, it is seen that a maximum of twelve-fold difference of electric current occurs depending on the direction of voltage, so that the structural element has a rectifying action. In addition, a color change of from a yellow color at −3 V to a blue color at 3 V was observed.

Example 18

(Production of Structural Element Having an Optical Response Capability)

Figure 21:
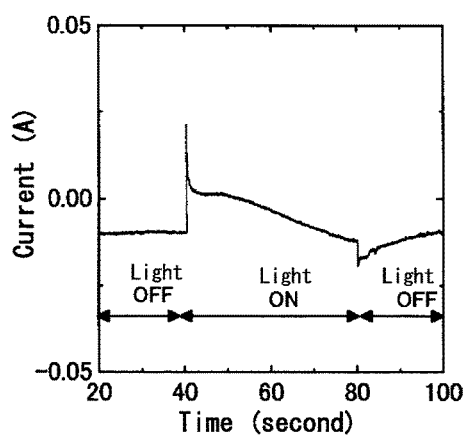
FIG. 21 is a graph showing a change of current of the structural member having Prussian blue nanoparticles measured in Example 17, with respect to the current obtained when the structural member is irradiated with a xenon lamp.
Figure 22:
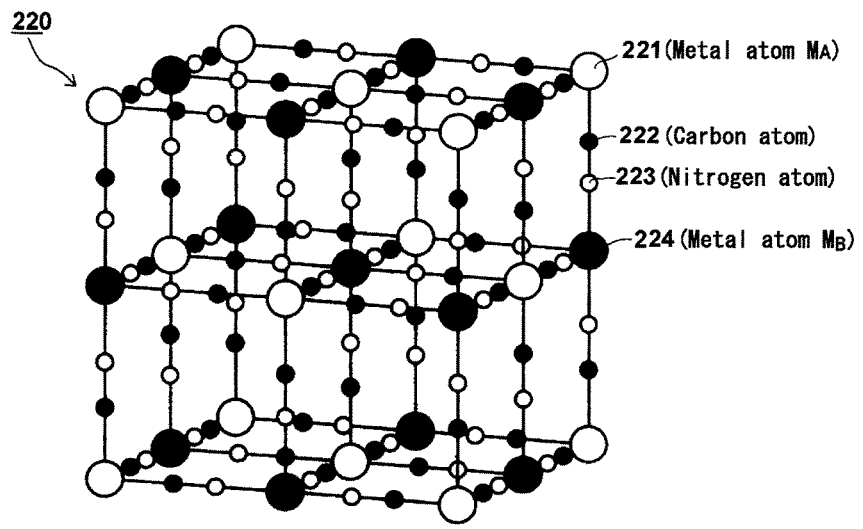
FIG. 22 is an illustration diagram showing schematically the crystal structure of the Prussian blue metal complex.

The structural element produced in Example 5 was irradiated at a distance of 10 cm from the homogeneous irradiation lens (RLQ-1, manufacture by Asahi Spectra Co., Ltd.) connected to the xenon lamp (MAX-310, manufacture by Asahi Spectra Co., Ltd.). As a result, a pulse-like electric current was observed immediately after the start of irradiation as shown in FIG. 21. Herein, the electric current is not zero prior to light irradiation. This is because this device has a battery function. Further, it is seen that the electric current flows in the opposite direction by light irradiation. Namely, it is said that this device is a device capable of switching from the anode to the cathode, or vice versa of the battery by light irradiation. Further, it is seen that the electric current responds to light irradiation at very high speed. From this, it is seen that this device also serves as an optical sensor.

Example 19

(Stabilization of Structural Element Produced Using an Alcoholic Solvent)

The dispersion liquid obtained by Preparation Example 1 was dried to dryness to obtain a powder. After that, by re-dispersible the powder in methanol, a methanol dispersion liquid of water-dispersible Prussian blue nanoparticles was obtained. Using this methanol dispersion liquid, a spin coat thin film was produced in the same manner as in Processing Example 1. Using this thin film, treatments were each conducted in the same manner as in Examples 1, 4 and 6. As a result, peeling of any one of the treated thin films in water was not seen, so that stabilization of these thin films was confirmed.

The invention claimed is:

1. A method of producing a structural member having Prussian blue-type metal complex nanoparticles, the method comprising the steps of:

providing a substrate;
preparing a dispersion liquid comprising nanoparticles consisting of Prussian blue-type metal complex, the nanoparticles having been dispersible in water, wherein the dispersion liquid further comprises a medium selected from the group consisting of a water medium, an alcoholic solvent, and mixtures thereof;
wherein the dispersion liquid is prepared via the following preparation process:
    coating the substrate with the dispersion liquid; and
    drying the medium of the dispersion liquid so as to provide a film of the water dispersible nanoparticles on the substrate;
stabilizing the nanoparticles in accordance with a step selected from the following a to d,
a: providing a surface of the substrate to be provided with the nanoparticles, the surface comprising an atom $M_S$ having the work function of 4.5 eV or more;
b: giving an electrochemical treatment to the nanoparticles;
c: giving a treatment by an agent containing an ion of a metal or metal complex to the nanoparticles;
d: giving a heat treatment to the nanoparticles;
wherein the preparation process of the dispersion liquid further comprises the steps of:
preparing a crystal of the Prussian blue-type metal complex in which a cyano group CN forms a bridge between a metal atom $M_A$ and a metal atom $M_B$; and
subjecting the crystal to a surface treatment with a metal cyano complex anion including a metal atom $M_C$ as a central metal and/or with a metal ion $M_D$;
wherein $M_A$ is at least one metal atom selected from the group consisting of vanadium, chromium, molybdenum, tungsten, manganese, iron, ruthenium, cobalt, nickel, platinum, and copper;
$M_B$ is at least one metal atom selected from the group consisting of vanadium, chromium, manganese, iron, ruthenium, cobalt, rhodium, nickel, palladium, platinum, copper, silver, zinc, lanthanum, europium, gadolinium, lutetium, barium, strontium, and calcium;
$M_C$ is at least one kind of metal atom selected from the group consisting of vanadium, chromium, molybdenum, tungsten, manganese, iron, ruthenium, cobalt, nickel, platinum, and copper;
$M_D$ is at least one kind of metal atom selected from the group consisting of vanadium, chromium, manganese, iron, ruthenium, cobalt, rhodium, nickel, palladium, platinum, copper, silver, zinc, lanthanum, europium, gadolinium, lutecium, barium, strontium, and calcium.

2. The method of producing a structural member according to claim 1, wherein, in the ion of the above-described metal or metal complex, the ion of the metal is a cation of the following metal atom $M_E$, and the ion of the metal complex is a metal complex anion comprising the following metal atom $M_F$;
wherein the above-described metal atom $M_E$ is at least one kind of metal atom selected from the group consisting of vanadium, chromium, manganese, iron, ruthenium, cobalt, rhodium, nickel, palladium, platinum, copper, silver, zinc, lanthanum, europium, gadolinium, ruthenium, barium, strontium, and calcium; and the metal atom $M_F$ is at least one kind of metal atom selected from the group consisting of vanadium, chromium, molybdenum, tungsten, manganese, iron, ruthenium, cobalt, nickel, platinum, and copper.

3. The method of producing a structural member according to claim 2, wherein the kind of the above-described metal atom $M_S$, the above-described metal atom $M_E$ and/or the above-described metal atom $M_F$ are changed to alter optical properties of the Prussian blue-type metal complex nanoparticles.

4. The method of producing a structural member having the Prussian blue-type metal complex nanoparticles according to claim 1, wherein the provision of the stabilized structural member is repeatedly conducted to form a multilayered structural member.

5. The method of producing a structural member having the Prussian blue-type metal complex nanoparticles according to claim 1, wherein the stabilized structural member is combined with a member other than the stabilized structural member to form a multilayered or molded structural member.

* * * * *